(12) United States Patent
McIntosh

(10) Patent No.: US 10,936,714 B1
(45) Date of Patent: Mar. 2, 2021

(54) SYSTEMS AND METHODS FOR PREVENTING CODE INSERTION ATTACKS

(71) Applicant: Gordon David McIntosh, Austin, TX (US)

(72) Inventor: Gordon David McIntosh, Austin, TX (US)

(73) Assignee: ITSEC Analytics PTE. LTD., Singapore (SG)

( * ) Notice: Subject to any disclaimer, the term of this patent is extended or adjusted under 35 U.S.C. 154(b) by 260 days.

(21) Appl. No.: 16/249,833

(22) Filed: Jan. 16, 2019

Related U.S. Application Data

(60) Provisional application No. 62/709,832, filed on Feb. 2, 2018, provisional application No. 62/761,566, filed on Mar. 30, 2018, provisional application No. 62/762,452, filed on May 7, 2018, provisional application No. 62/762,963, filed on May 29, 2018.

(51) Int. Cl.
*G06F 21/54* (2013.01)

(52) U.S. Cl.
CPC ........ *G06F 21/54* (2013.01); *G06F 2221/033* (2013.01)

(58) Field of Classification Search
CPC ............... G06F 21/54; G06F 2221/033; G06F 21/6281; G06F 21/51; G06F 21/52; G06F 21/566; G06F 21/629
See application file for complete search history.

(56) References Cited

U.S. PATENT DOCUMENTS

2015/0058997 A1  2/2015  Lee et al.
2016/0248809 A1  8/2016  Smith et al.

OTHER PUBLICATIONS

International Search Report and Written Opinion for PCT/US19/16209, dated May 2, 2019, 11 pages.

*Primary Examiner* — Paul E Callahan

(57) ABSTRACT

Methods and systems for preventing code injection attacks are disclosed. Embodiments include generating a random security tag and obtaining an instruction block comprising an instruction to be executed by a processor. The instruction block includes at least one no-operation (NOP) instruction at a specified location within the instruction block. A first exclusive OR with the random security tag is applied to at least one instruction at the specified location, the instruction block is stored, and fetched for passing to the processor. Prior to passing the instruction block to the processor, the instruction at the specified location is verified by applying a second exclusive OR to determine whether the instruction at the specified location is the NOP instruction. When a NOP instruction, the instruction block is passed to the processor. When not an NOP instruction, the passing the instruction block to the processor is omitted.

21 Claims, 24 Drawing Sheets

X[N] Native Object Code

Y[M] Native Object Code
w/ ST Block Header

| | |
|---|---|
| NOP | |
| Instruction 1 | Block $Y_1[0]$ |
| ... | |
| Instruction n-2 | |
| Instruction n-1 | |
| NOP | |
| Instruction 1 | Block $Y_1[1]$ |
| ... | |
| Instruction n-2 | |
| Instruction n-1 | |
| ... | |
| NOP | |
| Instruction 1 | Block $Y_1[M-2]$ |
| ... | |
| Instruction n-2 | |
| Instruction n-1 | |
| NOP | |
| Instruction 1 | Block $Y_1[M-1]$ |
| ... | |
| Instruction n-2 | |
| Instruction n-1 | |

FIG. 2C

$Y_1[M]$ Native Object Code w/ NOP Block Header

| | |
|---|---|
| NOP XOR ST | |
| Instruction 1 | Block $Y_2[0]$ |
| ... | |
| Instruction n-2 | |
| Instruction n-1 | |
| NOP XOR ST | |
| Instruction 1 | Block $Y_2[1]$ |
| ... | |
| Instruction n-2 | |
| Instruction n-1 | |
| ... | |
| NOP XOR ST | |
| Instruction 1 | Block $Y_2[M-2]$ |
| ... | |
| Instruction n-2 | |
| Instruction n-1 | |
| NOP XOR ST | |
| Instruction 1 | Block $Y_2[M-1]$ |
| ... | |
| Instruction n-2 | |
| Instruction n-1 | |

FIG. 2D

$Y_2[M]$ Native Object Code w/ Block Header Identifier

| NOP XOR ST |
|---|
| Instruction 1 XOR ST |
| ... |
| Instruction n-2 XOR ST |
| Instruction n-1 XOR ST |

Block $Y_3[0]$

| NOP XOR ST |
|---|
| Instruction 1 XOR ST |
| ... |
| Instruction n-2 XOR ST |
| Instruction n-1 XOR ST |

Block $Y_3[1]$

...

| NOP XOR ST |
|---|
| Instruction 1 XOR ST |
| ... |
| Instruction n-2 XOR ST |
| Instruction n-1 XOR ST |

Block $Y_3[M-2]$

| NOP XOR ST |
|---|
| Instruction 1 XOR ST |
| ... |
| Instruction n-2 XOR ST |
| Instruction n-1 XOR ST |

Block $Y_3[M-1]$

FIG. 2E

$Y_3[M]$ Unique Object Code
w/ Block Header Identifier

| NOP | NOP |
|---|---|
| Instruction$_1$ | Instruction$_2$ |
| ... | ... |
| Instruction$_{n-2}$ | Instruction$_{n-1}$ |

Block $Z[0]$

| NOP | NOP |
|---|---|
| Instruction$_2$ | Instruction$_3$ |
| ... | ... |
| Instruction$_{n-2}$ | Instruction$_{n-1}$ |

Block $Z[N-1]$

FIG. 2F

$Z[M]$ Native Object Code
w/ 2 - NOP Block Header

| ST XOR NOP | ST XOR Variable ST | Block $Z_1[0]$ |
|---|---|---|
| Instruction$_1$ XOR NOP | Instruction$_2$ XOR NOP | |
| ... | ... | |
| Instruction$_{n-2}$ XOR NOP | Instruction$_{n-1}$ XOR NOP | |
| ST XOR NOP | ST XOR Variable ST | Block $Z_1[N-1]$ |
| Instruction$_1$ XOR NOP | Instruction$_2$ XOR NOP | |
| ... | ... | |
| Instruction$_{n-2}$ XOR NOP | Instruction$_{n-1}$ XOR NOP | |

FIG. 2G

$Z_1[M]$ Unique Object Code
w/ 2 Field Block Header

| 0............7 | 8............15 | 16............23 | 24............31 |

A    Bits 0-31     Random Number
     Modifier - None

B    Bits 0-31    Random Number (RN)
     Modifier (Header only)
     TRUSTED   - Random Number XOR 0x0
     UNTRUSTED  - Random Number XOR 0x1

C. Variable ST (VST)
     Bits 0-23    - low 24 bits of PID or TID
     Bits 24-27  - Unused
     Bits 28-29  - Privilege Level
            00 – user
            01 – Supervisor
            10 – Hypervisor
            11 – Illegal
     Bits 30-31   Multilevel trust
            11 – Untrusted
            10 - Minimal Trust
            01 - High Trust
            00 – Fully Trusted Note: ST – Security Tag A Variable ST is used when a stronger ST is desired, or when additional attributes are necessary for processing such as multilevel trust relationship, Privilege Level, PID, or TID. Each attribute must occupy architected, non-overlapping fields.

FIG. 2H

Security Tag (ST) Formats

| |
|---|
| ELF Header |
| Program Header Table |
| .bss Section |
| .rodata Section |
| .data Section |
| .init Section |
| .text Section |
| .fini Section |
| .note.GNU-stack |
| .signature |
| .source |
| Section Header Table |

FIG. 2I

ELF File Format

Software ST Insertion Processing

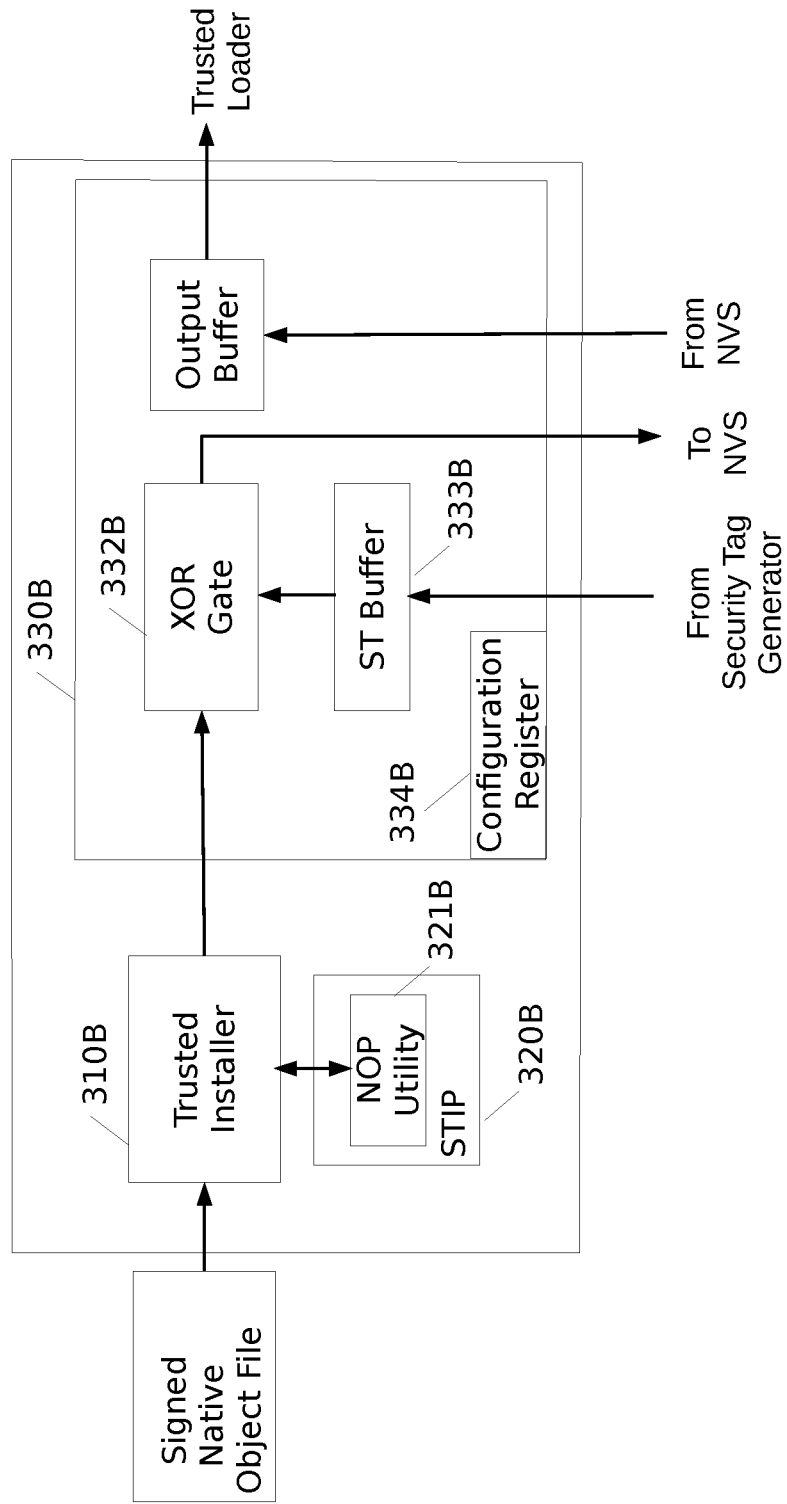

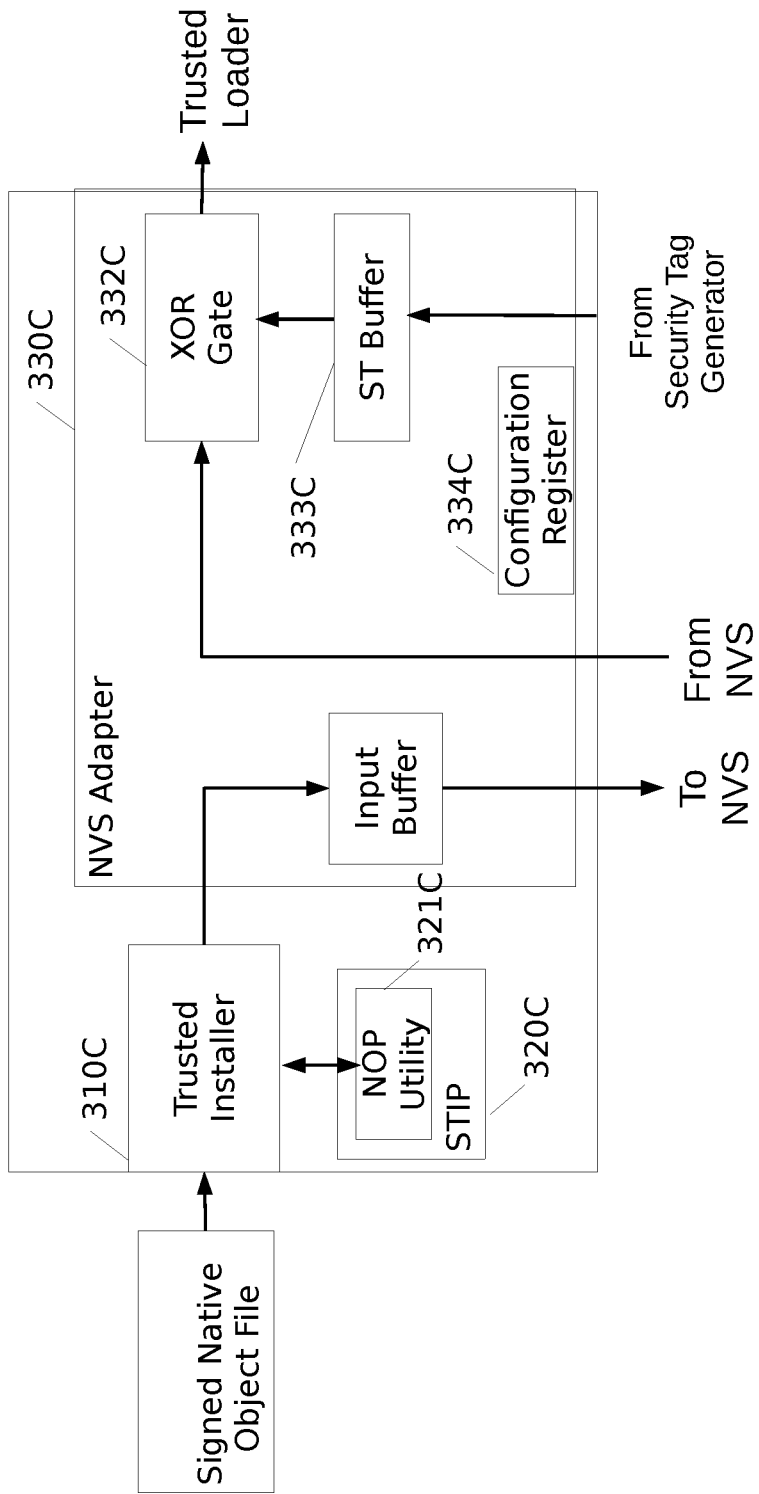

Hardware ST Insertion Processing
NOP Preprocessed

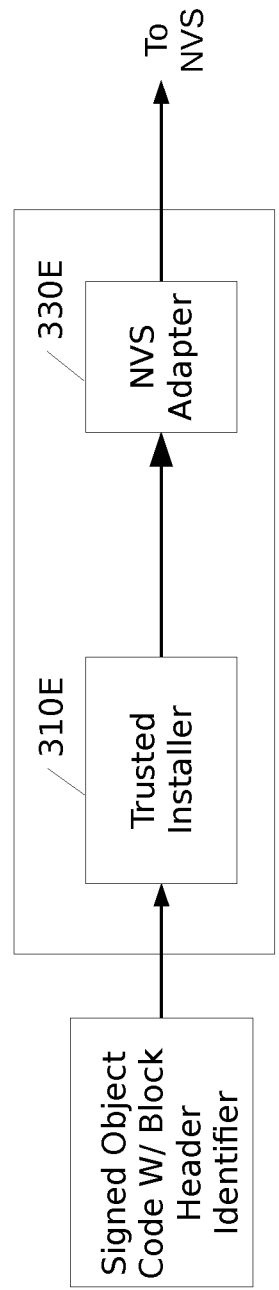

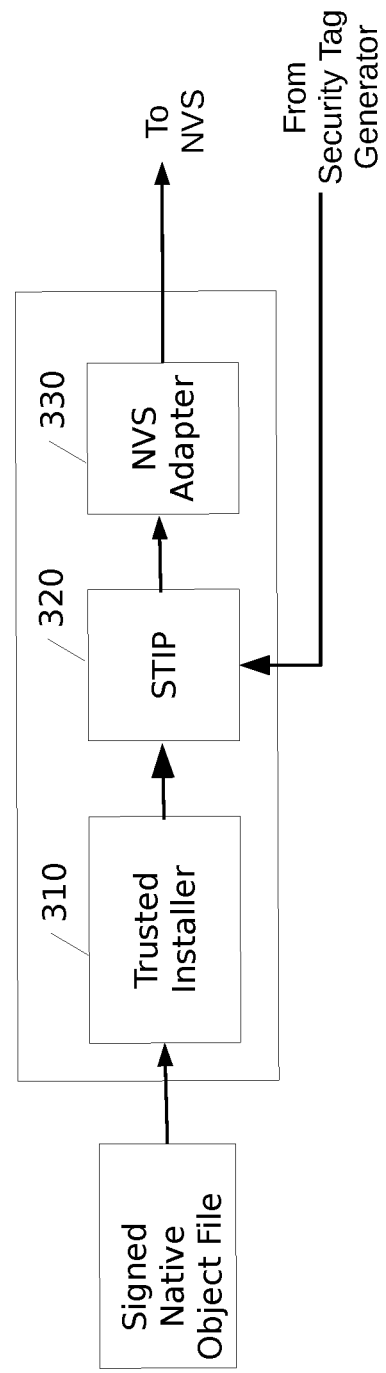

Hardware ST Processing Unit w/Trust

Minimal Hardware ST Processing Unit

Privilege Level ST Buffering

CTR Mode ST Processing Unit w/Trust

Address Range Mode ST Processing Unit w/Trust

ST Processing Unit

Developer Site A

Developer Site B

Developer Site

End User Device

Bidirectional Bus Buffer Bit-0 (Read cycle) and XOR

Bidirectional Bus Buffer w/XOR ST Bit-0 (Read Cycle)

SYSTEMS AND METHODS FOR PREVENTING CODE INSERTION ATTACKS

CROSS-REFERENCE TO RELATED APPLICATIONS

The present application claims priority to U.S. Provisional Application No. 62/709,832, filed Feb. 2, 2018, U.S. Provisional Application No. 62/761,566, filed Mar. 30, 2018, U.S. Provisional Application No. 62/762,452, filed May 7, 2018, and U.S. Provisional Application No. 62/762,963, filed May 29, 2018, the disclosures of which are incorporated by reference herein in their entirety.

TECHNICAL FIELD

The present invention relates generally to an improved data processing system and, more specifically, to validation of trusted code and prevention of code insertion attacks based on security tag field in the instruction stream of trusted code and the subsequent validation. Still more particularly, the present invention provides that the security tag inserted into processor instructions is unique and therefore effectively creates a unique instruction set architecture on every device.

BACKGROUND OF THE INVENTION

With this increased connectivity through the Internet, computer systems are experiencing an increasing number of attacks by threat agents that are using increasingly sophisticated attack vectors. As the number of systems connected to insecure networks, both intranet and Internet, the potential for damage increases; to prevent this the currently available solutions include, active methods such as malware detection software, firewalls, and intrusion detection, government initiatives, security policies, and evaluation methodologies. Malware detection software are programs or code that scan data input through network connections and file systems for known malware, as well as, applying rules based tools to scan for malware-like programs. Currently, there are over 60,000 known types of malware targeting Windows, 40,000 or so for Macintosh, approximately 5,000 for commercial UNIX versions, 40,000 for LINUX variants and more than 35,000 malicious Android programs. Firewalls are used to block network access from sources not specifically allowed. Extensive initiatives from US Government agencies, such as the National Security Agency (NSA), National Information Assurance Partnership (NIAP), National Institute of Standards and Technology (NIST), and Federal Information Processing Standards (FIPS), are being implemented. Committee on National Security Systems (CNSS) No. 11 is a security policy governing acquisition of all Information Technology (IT) products by the United States Government (USG) that requires the evaluation of all IT products under the Common Criteria (CC). Further, a large number of nations have embraced the CC Evaluation methodologies, a rigorous and expensive methodology used to evaluate the security assurance level that an IT system possesses. This methodology encompasses all aspects of IT product development, ranging from building security where development activities take place, Configuration Management (CM) systems, development activities, and up to and including secure delivery of the product to prevent tampering. Currently the USG requires this evaluation to be completed for all IT equipment used in national security, critical infrastructure and Homeland Defense systems. The Payment Card Industry (PCI) has developed a policy-based security specification and require financial institutions doing a significant number of transactions to be assessed using this specification. Even as more rigorous and costly methodologies are employed to defend against attacks, the computer systems worldwide are experiencing an increasing number of successful attacks by attackers using more and more sophisticated methods.

Unfortunately, since the beginning of the computer age and continuing to this day, consumers, business, industry and governments have been focused on computer functionality and performance with little attention to computer security; as a result computer security has been relegated to a "band-aid" approach after serious vulnerabilities were exploited; i.e., issue a patch to fix the vulnerability in question but rarely address the underlying problem that security was never a part of the design paradigm. Additionally, targeted security testing is almost nonexistent in our current industry with most software developers taking the "let the end-customer do the testing" approach.

Additionally, security threats have continued to evolve into what has become termed an Advanced Persistent Threat (APT) that have become increasingly sophisticated, diverse, targeted, aggressive, and successful; moreover, these attacks are being perpetrated by threat agents from both organized crime and nation-states. These threat agents exhibit common characteristics such as large well educated teams with high levels of expertise, persistence and determination, allowing them to break through defenses. These attackers have a variety of goals such as gathering intelligence for economic competitive, political motives, and financial gain.

The APT is a set of stealthy and continuous computer hacking processes, often orchestrated by nation-states and organized crime, targeting a specific entity. An APT usually targets organizations and/or nations for business or political motives. APT processes require a high degree of covertness over a long period. The "advanced" process signifies sophisticated techniques using malware to exploit vulnerabilities in systems. The "persistent" process suggests both a prolonged attack is mounted until successful and that, after initial exploitation, an external command and control system is continuously monitoring and extracting data from a specific target. The "threat" process indicates human involvement in planning and/or orchestrating the attack.

Successful development of an APT usually requires a group, such as a government, with both the capability and the intent to target, persistently and effectively, a specific entity. The term is commonly used to refer to cyber threats, in particular that of Internet-enabled espionage using a variety of intelligence gathering techniques to access sensitive information, but applies equally to other threats such as that of traditional espionage or attacks. Other recognized attack vectors include infected media, supply chain compromise, and social engineering. The purpose of these attacks is to place custom malicious code on one or multiple computers for specific tasks and to remain undetected for the longest possible period. Knowing the attacker artifacts, such as file names, can help a professional make a network-wide search to gather all affected systems Individuals, such as an individual hacker, are not usually referred to as an APT, as they rarely have the resources to be both advanced and persistent even if they are intent on gaining access to, or attacking, a specific target.

In the 2016 USENIX Enigma Conference, Rob Joyce, Chief of the USA's National Security Agency (NSA) Tailored Access Operation (TAO) spoke about defeating an APT. The TAO is a cyber-warfare intelligence-gathering unit of the NSA; active since around 1998, TAO identifies, monitors, infiltrates, and gathers intelligence on computer systems being used by entities foreign to the United States. The NSA terms these activities "computer network exploitation". TAO is reportedly "now the largest and arguably the most important component of the NSA's huge Signals Intelligence Directorate (SIGINT), consisting of more than 1,000 military and civilian computer hackers, intelligence analysts, targeting specialists, computer hardware and software designers, and electrical engineers."

Information disclosed by former NSA contractor Edward Snowden indicates TAO has software templates allowing it to break into commonly used hardware, including "routers, switches, and firewalls from multiple product vendor lines". Additionally, The Washington Post reports TAO engineers prefer to tap networks rather than isolated computers, because there are typically many devices on a single network.

While there is concern for TOA's operations, it must be realized there are 29 countries that now have formal military or intelligence units dedicated to offensive cyber efforts. Some of these are:
1. Peoples Liberation Army (PLA) Unit 61398, China
2. Unit 8200, Israel
3. The Syrian Electronic Army (SEA), Syria
4. Tarh Andishan, Iran
5. APT28, Russia
6. Axiom, China
7. Bureau 121, Pyongyang, North Korea
8. Hidden Lynx, China Traditional cyber security measures such as defense-in-depth, firewalls and antivirus cannot protect against APTs, and leave organizations vulnerable to data breaches. Currently there are implementations that partially solve the problem; however, each as serious flaws that limit its effectiveness.

Another factor that requires improved methods is that computer technology is at the edge of a major paradigm shift as industry moves to Assisted Intelligence (AI) in the very near future and General Artificial Intelligence (GAI) in the not too distant future; making possible far more advanced computer attacks that that current IT security technologies cannot hope to contain:
1. Currently, hackers/attackers, security experts and software testers all use software tools to search source code (and possibly object code) to assist in the identification of exploitable vulnerabilities. Fortunately this process is difficult and time consuming giving developers an advantage.
2. In the near future the same actors will certainly be using AI at well-funded facilities. Unfortunately, nation-states will then get a sizable advantage as developers have time and financial constraints that nation-states do not. The use of advanced tools that rely on AI may produce a ten-fold to 100-fold decrease in time to identify an exploitable vulnerability as well as produce code to perform the exploit.

The scenario outlined in #2 above will only worsen as AI systems progress to GAI; nation-state attackers will certainly use the most advanced GAI systems available to find, analyze, and exploit, far outpacing the capability developers not capable of funding advanced GAI tool-sets.

As amply demonstrated from the ever rising number of breaches reported, present methods have been and continue to be ineffective in preventing code injection attacks.

SUMMARY OF THE INVENTION

The present invention provides methods, system, and apparatuses for the prevention of certain classes of computer malware attacks that have previously not been preventable. The exemplary aspects of the present invention details an effective methodology to statically or dynamically implement the insertion of a security tag (or tags) within each block of trusted native instructions, thus creating a unique local identifier that cannot be predicted by attackers. In some aspects, this mechanism may be implemented such that the ST(s) are validated prior to passing to processing chain (processor or external cache), guaranteeing exception processing commence prior to the malware entering the processor or cache, and no instruction pipeline or cache flush are necessary; however, where design dictates, the implementation may be internal to the processor anywhere prior to instruction decoding.

In some embodiments of the present invention, the mechanism may be targeted specifically against attacks that depend on injecting untrusted code into a target data processing system through single or multiple vulnerabilities in the firmware, operating system software, and/or application layer software programs; those of ordinary skill in the art will recognize that these attacks are by far the most dangerous attacks possible. These attacks include data memory injection attacks (buffer overflow, format string, etc.), instruction memory injection attacks, and any attack variant that requires execution of code that is not loaded by the trusted loader.

To address threats originating in code from email, browser, or removable media and stored or loaded under user control, aspects of the present invention employ a methodology to preserve trust; code that is loaded or stored whose source is questionable may be marked as having limited trust or being untrusted. When the code being loaded from memory to processing chain has limited trust or is untrusted, the operating system may be alerted, which may provide an advantage by presenting the opportunity to prevent untrusted code from entering cache (or cache bypass), or take other actions as appropriate.

Some implementations of the present invention may support multiple operational modes, such as static with trust, dynamic with trust, and static with dynamic trust support, where trust may be simple trust, or multilevel trust. Simple trust may be either TRUSTED or UNTRUSTED whereas multilevel trust may be defined in multiple levels, e.g., Ultimate, Full, Marginal, Untrusted, or Undefined. Those of ordinary skill in the art will appreciate that each design will define trust based on the particulars of their system.

Additionally, the present invention mitigates attacks against networks which connect multiple systems in a LAN/WAN because each system may have a different instruction set architecture that may be unknown to attackers, which may provide an advantage of making the attacks statistically impossible.

The insertion of the security tag(s) may result in slightly slower code installation and a very small performance penalty (<0.4%); the hardware changes may be minimal, instruction execution in the processor core may not be altered, the size of the instruction may remain unchanged, the data and instruction bus may remain unchanged, and no modification to the processor may be needed unless design dictates an internal implementation.

In one particular aspect of the disclosure, a method of preventing code injection attacks includes generating at least one random security tag having a length equal to or less than a length of native instructions configured for execution by a processor of a computer system, and obtaining an instruction block comprising at least one instruction of the native instructions to be executed by the processor. The instruction block includes at least one no-operation (NOP) instruction at at least one specified location within the instruction block. The method also includes applying a first exclusive OR logical operation with the at least one random security tag to at least one instruction at the at least one specified location within the instruction block, storing the instruction block in instruction memory, and fetching the instruction block from instruction memory including the at least one instruction at the at least one specified location for passing to the processor. The method further includes verifying, prior to passing the instruction block to the processor, the at least one instruction at the at least one specified location, wherein the verifying includes applying a second exclusive OR logical operation with the at least one random security tag to the at least one instruction at the at least one specified location within the instruction block, and comparing the result of the applying the second exclusive OR logical operation to the at least one instruction to determine whether the at least one instruction at the at least one specified location is the NOP instruction. When the comparing indicates that the at least one instruction at the at least one specified location is the NOP instruction, the method includes passing the instruction block to the processor. When the comparing indicates that the at least one instruction at the at least one specified location is not the NOP instruction, the method includes omitting the passing the instruction block to the processor and asserting a hardware exception signaling the processor to enter an exception processing mode, wherein the processor determines a reason the hardware exception was asserted.

In another aspect, a system configured to prevent code injection attacks includes a memory and at least one processor coupled to the memory. The system also includes a security tag generator processor configured to generate at least one random security tag having a length equal to or less than a length of native instructions configured for execution by the at least one processor. The system further includes a security tag insertion processor configured to obtain an instruction block comprising at least one instruction of the native instructions to be executed by the at least one processor, the instruction block including at least one no-operation (NOP) instruction at at least one specified location within the instruction block, to apply a first exclusive OR logical operation with the at least one random security tag to at least one instruction at the at least one specified location within the instruction block, and to store the instruction block in instruction memory. The system also includes a security tag processing unit configured to fetch the instruction block from instruction memory including the at least one instruction at the at least one specified location for passing to the at least one processor, and to verify, prior to passing the instruction block to the at least one processor, the at least one instruction at the at least one specified location. The verifying the at least one instruction includes applying a second exclusive OR logical operation with the at least one random security tag to the at least one instruction at the at least one specified location within the instruction block, and comparing the result of the applying the second exclusive OR logical operation to the at least one instruction to determine whether the at least one instruction at the at least one specified location is the NOP instruction. When the comparing indicates that the at least one instruction at the at least one specified location is the NOP instruction, the verifying includes passing the instruction block to the at least one processor. When the comparing indicates that the at least one instruction at the at least one specified location is not the NOP instruction, the verifying includes omitting the passing the instruction block to the at least one processor and asserting a hardware exception signaling the at least one processor to enter an exception processing mode, wherein the at least one processor determines a reason the hardware exception was asserted.

In yet another aspect, a non-transitory computer readable medium includes program code recorded thereon for preventing code injection attacks, wherein the program code is configured to cause one or more computers to generate at least one random security tag having a length equal to or less than a length of native instructions configured for execution by a processor of a computer system, to obtain an instruction block comprising at least one instruction of the native instructions to be executed by the processor, the instruction block including at least one no-operation (NOP) instruction at at least one specified location within the instruction block, to apply a first exclusive OR logical operation with the at least one random security tag to at least one instruction at the at least one specified location within the instruction block, to store the instruction block in instruction memory, to fetch the instruction block from instruction memory including the at least one instruction at the at least one specified location for passing to the processor, and to verify, prior to passing the instruction block to the processor, the at least one instruction at the at least one specified location. The verifying the at least one instruction includes applying a second exclusive OR logical operation with the at least one random security tag to the at least one instruction at the at least one specified location within the instruction block, and comparing the result of the applying the second exclusive OR logical operation to the at least one instruction to determine whether the at least one instruction at the at least one specified location is the NOP instruction. When the comparing indicates that the at least one instruction at the at least one specified location is the NOP instruction, the verifying includes passing the instruction block to the processor. When the comparing indicates that the at least one instruction at the at least one specified location is not the NOP instruction, the verifying includes omitting the passing the instruction block to the processor and asserting a hardware exception signaling the processor to enter an exception processing mode, wherein the processor determines a reason the hardware exception was asserted. The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2C is a diagram of code section Y1[M], Native Object Code w/ NOP Block Header, an executable, native instruction format with a single NOP instruction inserted at the beginning of each code block;

FIG. 2D is a diagram of code section Y2[M], Native Object Code w/ Block Header Identifier, generated by applying the bitwise operator, XOR, to only the NOP instruction within each block with the Security Tag (ST);

FIG. 2E is a diagram of code section Y3[M], Unique Object Code w/ Block Header Identifier, generated by applying the bitwise operator, XOR, to every instruction(s) within each block with the Security Tag (ST);

FIG. 2F is a diagram of code section Z[M], Native Object Code w/ 2—NOP Block Header, a native instruction format with two NOP instructions inserted at the beginning of each code block;

FIG. 2G is a diagram of code section Z1[M], Unique Object Code w/ 2 Field Block Header, generated by substituting a Variable ST in field 2, then applying the bitwise operator, XOR, to both header fields and every instruction within each block with the Security Tag (ST);

FIG. 2H is a diagram of example Security Tag formats;

FIG. 2I is a diagram illustrating the Executable Loadable Format (ELF) File Format;

FIG. 3B is a diagram illustrating components used in Security Tag Insertion Processing implemented partially in software and partially by hardware modification to the NVS Adapter with XOR on write to Non Volatile Storage (NVS);

FIG. 3C is a diagram illustrating components used in Security Tag Insertion Processing implemented partially in software and partially by hardware modification to the NVS Adapter with XOR on read from Non Volatile Storage (NVS);

FIG. 3E is a diagram illustrating components that requires the NOP insertion and ST processing performed by the developer/publisher;

FIG. 3F is a high level diagram illustrating components used in Security Tag Insertion Processing unit (STIP);

DETAILED DESCRIPTION OF THE INVENTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1:
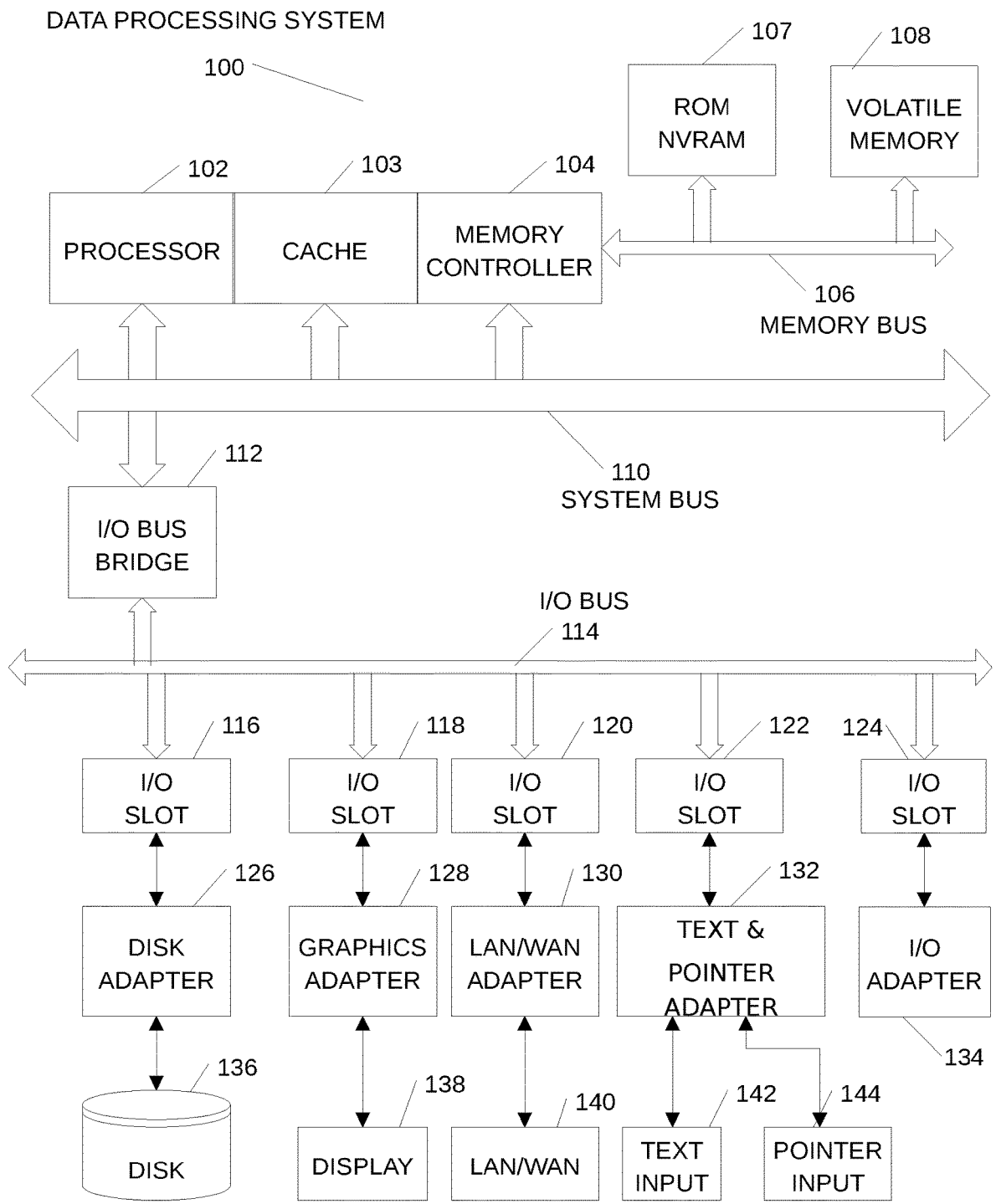
FIG. 1 is a block diagram of a data processing system in which the present invention may be implemented.

With reference now to the figures, and in particular with reference to FIG. 1, a block diagram of a data processing system in which the present invention may be implemented is depicted. Those of ordinary skill in the art will appreciate that the data processing system 100 may vary; it may represent a mainframe, desktop, laptop, tablet computer, smartphone, autonomous vehicle control computer, military drone control computer, industrial process controller, Internet of Things device, or any other hardware platform providing the essential elements for the target system. Data processing system 100 may a non-partitioned system, a logical partitioned (LPAR), or a physical partitioned (PPAR) data processing system. Thus, data processing system 100 may have a single operating system running alone, multiple heterogeneous operating systems, or multiple instances of a single operating system running simultaneously, where the operating systems may have any number of software programs executing within it. Data processing system 100 may be a single processor system, a symmetric multiprocessor (SMP) system, or asymmetric multiprocessor (AMP) system. Processor 102 may represent a single processor, or a plurality of processors connected to system bus 110. Also connected to system bus 110 is the cache 103, and memory controller 104 which provides an interface to ROM/NVRAM memory 107 and volatile memory 108 via memory bus 106. The processor 102, cache 103, and memory controller 104 may be integrated on the same chip or separate as design demands. Those of ordinary skill in the art will appreciate that the cache 103 may be multilevel, with zero or more levels integrated on processor 102 and other levels on separate chip or chips; additionally, the cache may be of varying sizes and types. The memory controller 104 fetches program and data from ROM/NVRAM memory 107 or volatile memory 108, places in cache or directly in processor registers; cache may also integrated on the memory controller. The memory controller 104 may also provide hardware MMU support required by the operating system to allow multiple independently compiled programs to run simultaneously and transparently, enforces memory protection, enforces separation of user and kernel space, and under operating system control, provides a cycle-by-cycle (real time) translation between multiple virtual address spaces and the physical memory address space(s).

The I/O bus bridge 112 is also connected to system bus 110 and provides an interface to I/O bus 114. I/O bus 114 provides interface to I/O slots 116, 118, 120. 122. and 124, which provide access to I/O adapters Disk Adapter 126, Graphics Adapter 128, Lan/Wan Adapter 130. Text & Pointer Adapter 132, and I/O Adapter 134. These adapters provide Interface to the Disk 136, Display 138, Lan/Wan 140, Text Input 142, and Pointer Input 144. In this context "Disk" refers to a method of non-volatile storage and is not limited to Hard Disk Drive (HDD), Solid State Disk (SSD), or other specific technology. Those of ordinary skill in the art will appreciate that I/O bus 114 may be of different technologies as determined by the manufacturer's preference such as peripheral component interconnect (PCI), Accelerated Graphics Port (AGP), or Industry Standard Architecture (ISA). Additionally, the I/O bus bridge 114 may integrate any or all adapters, disk adapter 126, graphics adapter 128, LAN/WAN adapter 130, text and pointer input adapter 132 and eliminate any or all I/O slots, I/O slots 116, 118, 120, 122, and 124. Also, specialized data processing systems such as smartphones, autonomous vehicles, military drones, industrial process controller, and IoT devices may require specialized input/output devices not depicted; however, these devices are out of scope for the present invention.

In LPAR or PPAR data processing systems, the hard disk adapter 126, the graphics adapter 128, the LAN/WAN adapter 130, the text and pointer input adapter (keyboard mouse equivalent) adapter 132, and the I/O adapter 134 may be assigned to different partitions or shared by multiple partitions. In this case, disk adapter 126 provides control and connection disk 136, graphics adapter 128 provides a connection for display 138, and I/O adapter 134 allows additional devices be connected.

Those of ordinary skill in the art will recognize that the hardware in FIG. 1 may vary depending on the implementation with high levels of component integration in embedded systems such as IoT devices, autonomous vehicle control computer, military drone control computer. Other devices such as flash read-only or flash read-write memory may be used in addition to, or in conjunction with the hardware depicted in FIG. 1. The data processing system 100 may be configured as a network client and may not contain a disk adapter 126 or disk 136, but rely on the LAN/WAN adapter 130 (or other means) to interface to a remote server providing an operating system, any runtime executive, and application code.

Not illustrated on FIG. 1 is an operating system that executes on processor 102 and is used to coordinate and control various components within data processing system 100. The operating system may be a commercially available operating system such as Windows 10™ from Microsoft Corporation, Google Inc.'s Android OS, Apple Inc.'s iOS, non-commercially available operating system used in proprietary or military systems, or other OS having both a user and kernel domain enforced by hardware. System level code such as a Java™ runtime executive from Oracle Corporation may run in conjunction with the operating system. Additionally, user domain code is not depicted but presumed to execute on the data processing system 100 under control of the operating system and any associated runtime executives. Computer instructions for the operating system, any runtime executive, and applications or programs are stored on storage devices depicted as disk 136, accessed via I/O bridge 112 and disk adapter 126, then loaded into volatile memory 108 for execution by processor 102. Computer instruction for boot time are stored on ROM/NVRAM 107 and may be executed from there, or moved to volatile memory 108 for execution.

The depicted example in FIG. 1 and above-described examples are not meant to imply architectural limitations. For example, data processing system 100 may also be a mainframe, desktop, laptop, tablet computer, smartphone, autonomous vehicle control computer, military drone control computer, industrial process controller, Internet of Things device, or any other hardware platform providing the essential elements for the target system.

The normal runtime processes of the present invention are performed by processor 102 using computer implemented instructions stored in volatile memory 108.

All examples referring to executable files contained herein refer to the Executable and Linkable Format (ELF); however, except as specifically noted, descriptions may refer to the executable instruction section, file headers, data sections. Those of ordinary skill in the art will recognize that there are other executable file formats and the use of the ELF format is for illustration only and does not limit the present invention; additionally, executable files can be delivered for installation in "packages" such as in the RPM Package Manager (RPM) format. (The name is intentionally recursive)

Turning now to FIG. 2I, a diagram depicting the format of an ELF file is shown for use in this illustrative example. The sections pertinent to the present invention are as follows:

1. .text: This section holds the "text", or executable instructions, of a program.
2. .init: This section holds executable instructions that contribute to the process initialization code. When a program starts to run the system arranges to execute the code in this section before calling the main program entry point.
3. .fini: This section holds executable instructions that contribute to the process termination code. When a program exits normally the system arranges to execute the code in this section.
4. .note.GNU-stack: This section must not be present or must not have the attribute SHF_EXECINSTR which indicates the section contains executable machine instructions; otherwise, this invention will prevent any code within this section from executing and initiate exception processing.
5. .signature: This section is optional and holds the cryptographic signature for this ELF file.

6. .source: This section is optional and holds the source information of the file, e.g., URI, IP, MAC Address, etc. This information is to be used when verifying a file signature, or when a file signature is not present.

The .bss, .rodata, and .data sections are not pertinent to the present invention and not discussed further; they are illustrated only for completeness.

Figure 2A:
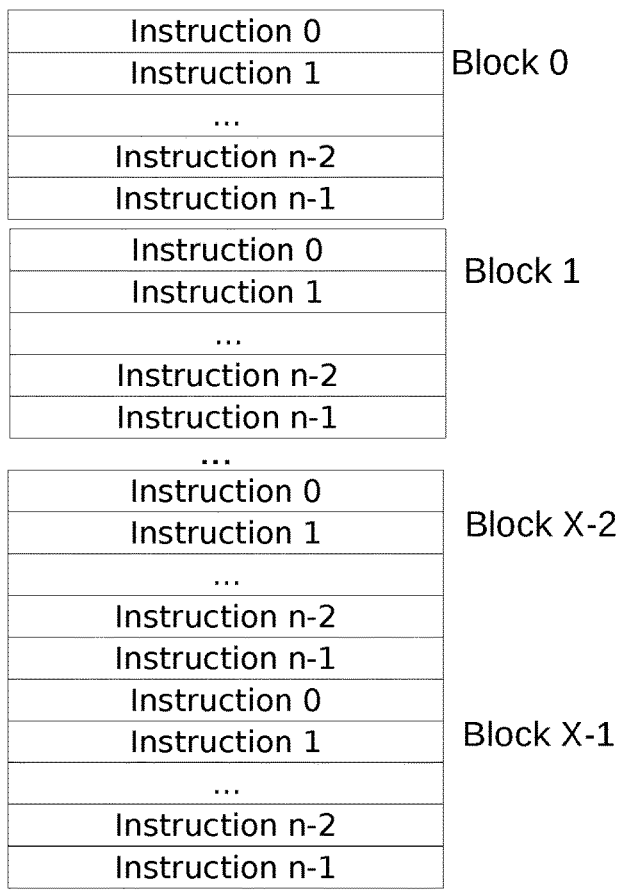
FIG. 2A is a diagram of code section X[N] in Native Object Code.

Turning now to FIG. 2A, a diagram depicting a code section X[N]; a memory image of a ".text", a ".init", or a ".fini" section as defined in the ELF file format, which may refer to a section containing executable machine instructions in a Linux based system. Code section X[N] consists of N blocks of n executable machine instructions generated by a compiler/linker in the native machine instruction set format. In systems not supporting the present invention, code injection attacks that are able to insert code equivalent to X[N] into memory that has the attribute SHF_EXECINSTR set, may execute arbitrary code on that system; thereby establishing a landing point that will allow more invasive attacks be mounted.

Figure 2B:
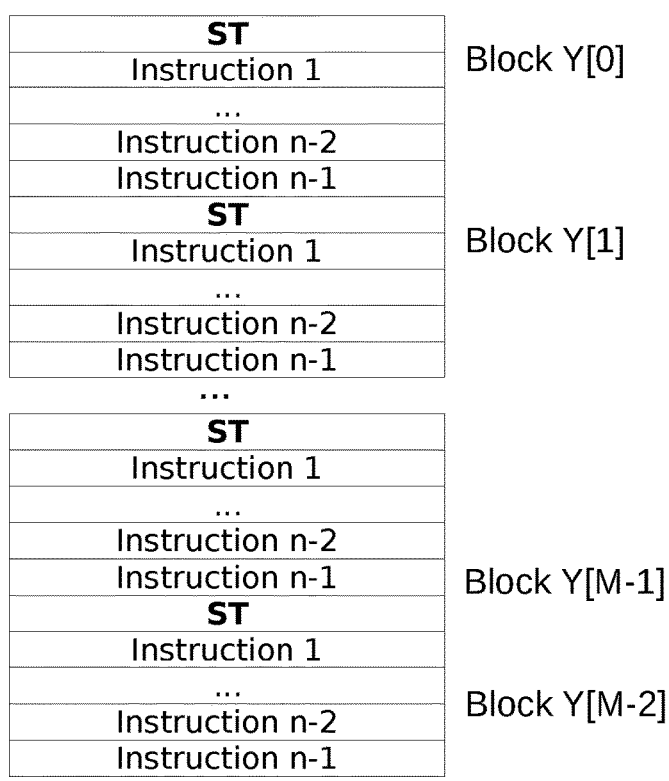
FIG. 2B is a diagram of code section Y[M], Native Object Code w/ ST Block Header, a non-executable format with a single Security Tag (ST) inserted at the beginning of each code block.

Turning now to FIGS. 2B and 2C, diagrams that illustrate the mechanism of the present invention are depict code sections Y[M] and $Y_1$[M]. In FIG. 2B, a diagram depicting code section Y[M], consisting of M blocks of n instructions. Code section Y[M] has been modified from code block X[N], depicted in FIG. 2A, by the insertion of one (or more) Security Tag (ST) within each block; in the illustrative example, one ST has been inserted at the beginning of each code block, rendering the instruction block unique and unknown to attackers. Security Tag processing prior to insertion into the processing chain_makes a comparison of this field to ensure the code block has not been inserted by an attacker (malware). After successful comparison, this ST will need to be overwritten with a benign executable instruction, such as a no-operation instruction (NOP), prior to insertion into the processing chain, possibly adding one or two processing cycles; therefore, an alternate method of ST insertion is examined.

Turning to FIG. 2C, a diagram depicting code section $Y_1$[M], consisting of M blocks of n instructions. Code section $Y_1$[M] has been modified from code s X[N], depicted in FIG. 2A, by the insertion of one (or more) native NOP instruction(s) within each block; in the illustrative example, one NOP has been inserted at the beginning of each code block; however, this does not create a unique instruction block. To render the instruction block shown in FIG. 2C unique and unknown to attackers; a function, "f(ST, NOP)" may be calculated and inserted in each block; however, the operation may be reversible. Since the properties of the bitwise operator XOR operator is reversible, it may be applied to achieve equivalence as follows:

$f$(ST,NOP)=ST XOR NOP and $f$((ST XOR NOP), NOP)=ST and $f$(ST,NOP)=ST XOR NOP and $f$((ST XOR NOP),ST)=NOP Thus, the bitwise operator XOR can perform the equivalent operation of inserting the ST into the code block where f(ST, NOP)=ST XOR NOP as shown in FIG. 2D, and thereby extended to all instructions in FIG. 2E.

Turning now to FIG. 2D, a diagram depicting code section $Y_2$[M] consisting of M blocks of n instructions. Code section $Y_2$[M] has been modified from code block Y[M] by applying the bitwise operator, XOR, to only the NOP instruction(s) within each block with the Security Tag (ST), generating a unique and identifiable block signature for each ST chosen; section $Y_2$[M] will not execute on native instruction processors unless the code sections are properly modified prior to execution. The NOP may be inserted in a fixed architected location or anywhere within each block, depending on the design of the embodiment selected.

Turning now to FIG. 2E, a diagram depicting code section $Y_3$[M], consisting of M blocks of n instructions. Code section $Y_3$[M], has been modified from code block Y[M] by applying the bitwise operator, XOR, with a unique Security Tag (ST) and every instruction within the block, generating a unique instruction set architecture for each ST chosen; therefore, $Y_3$[M], will not execute on native instruction processors unless the code sections are properly modified prior to execution. The NOP may be inserted in a fixed architected location or anywhere within each block, depending on the design of the embodiment selected.

Turning now to FIG. 2F, a diagram depicting code section Z[M], consisting of M blocks of n instructions. Code section Z[M] has been modified from code block X[N], depicted in FIG. 2A, by the insertion of one (or more) native NOP instruction(s) within each block; in the illustrative example, two NOP instructions have been inserted at the beginning of each code block. Those of ordinary skill in the art will recognize that an executable file that has NOP instructions embedded within the code blocks can be executed on systems not supporting the present invention; thereby making the invention's impact on a developer small, as backward hardware and software compatibility are maintained.

Turning now to FIG. 2G, a diagram depicting code section $Z_1$[M] consisting of M blocks of n instructions. Code block $Z_1$[M] has been modified from code block Z[M] by applying the bitwise operator, XOR, to the first NOP instruction within each block with the Security Tag (ST), generating a unique and identifiable block signature for each ST chosen. The second NOP has been overwritten by a Variable Security Tag that is used when a stronger ST is desired, or when additional attributes are necessary for processing; e.g., additional ST variability, multilevel trust relationship, Privilege Level, PID, or TID; each attribute may occupy architected, non-overlapping fields. Code block $Z_1$[M] will not execute on native instruction processors unless the code sections are properly modified prior to execution.

Turning now to FIG. 2H, a diagram depicting possible Security Tag (ST) formats; although, those of ordinary skill in the art will recognize that the format of the ST is design dependent and the fields may vary according to system design requirements. In the examples presented, Format A depicts the bits 0-31 represented as a random number with $2^{32}$ possible values; this format is appropriate in implementations of both static and dynamically defined Security Tags. FIG. 2H, Format B depicts the ST bits 0-31 represented as a random number with $2^{32}$ possible values; modified with Trust encoded as in single bit. Trust is assigned by either the Trusted Installer or Trusted Loader as TRUSTED or UNTRUSTED; in both cases, the Trust bit is then XORed into the "NOP XOR ST" at the start of each block.

FIG. 2H, Format C depicts the Variable Security Tag (VST) with an example encoding. This format is used to encode variable data into the second NOP in the block header of code section $Z_2$[M] as shown in FIG. 2G, for static or dynamic processing. In this example, the Process Identifier (PID) or Thread Identifier (TID), Privilege Level, and Trust are encoded in the fields as shown; these are dynamic and may be changed each time a new process is put on the run list. Other uses could be a block hash to ensure code is not overwritten; this would be an example of static processing. Those of ordinary skill in the art will recognize that the information encoded is design dependent.

Figure 6:
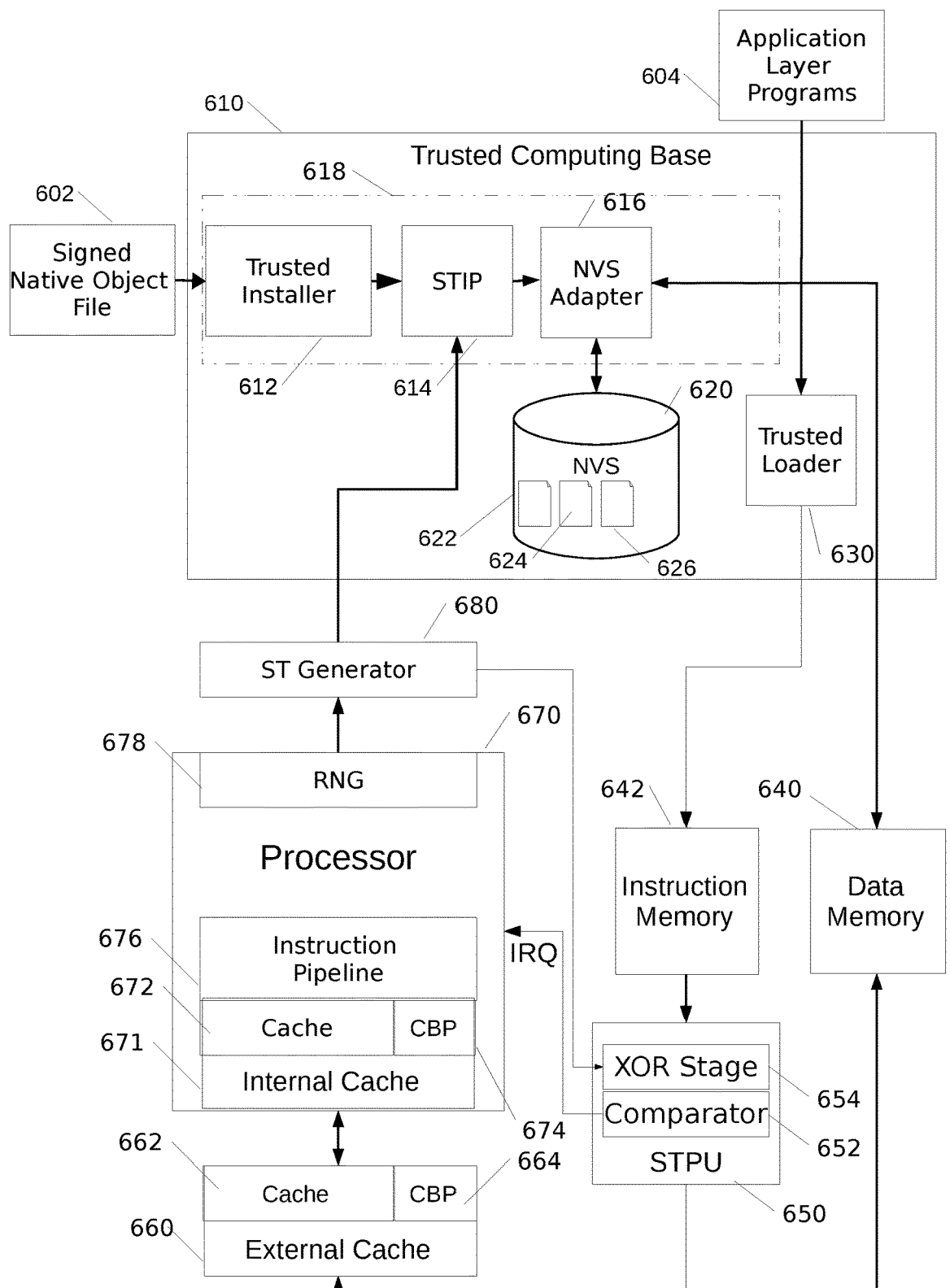
FIG. 6 is a block diagram of a typical end user device in accordance with the preferred embodiment of the present invention.

With reference now to FIG. 6, End User Device, a block diagram depicting an embodiment of the present invention is shown. Additionally, further implementation details of Security Tag Insertion Processor (STIP 614) and Security Tag Processing Unit (STPU 650) are presented with respect to FIGS. 3F and 4G respectively.

Figure 3A:
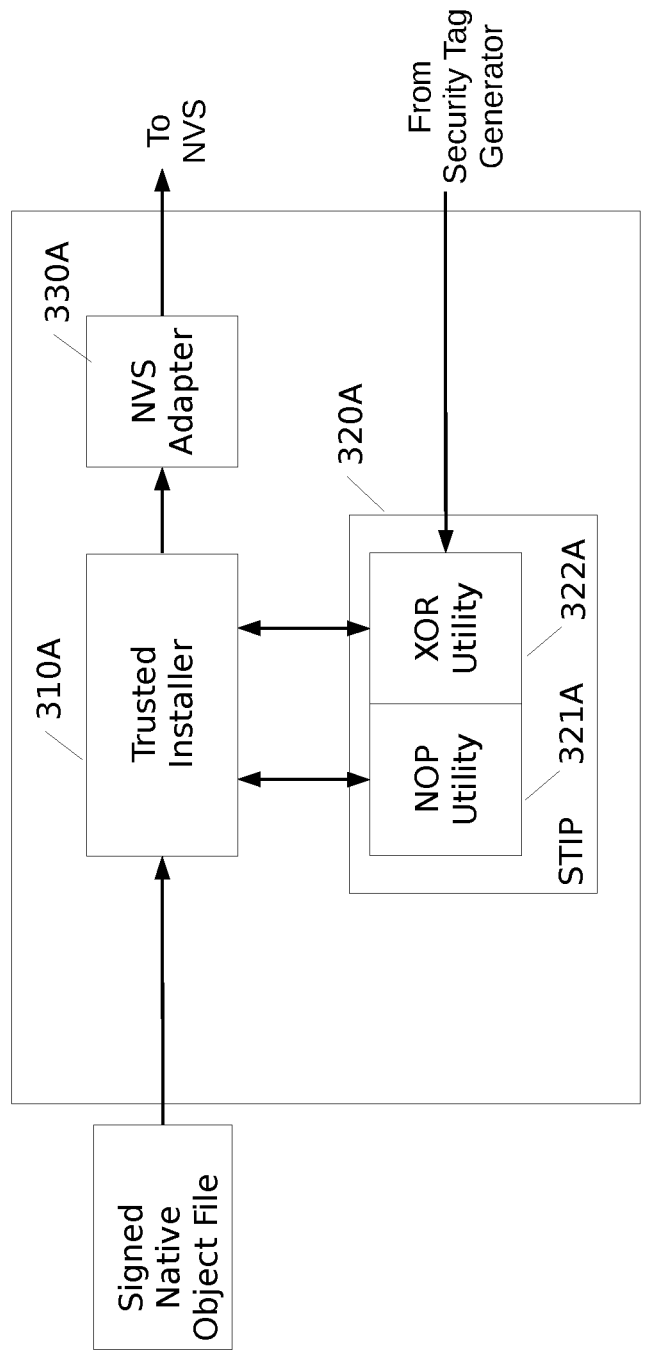
FIG. 3A is a diagram illustrating components used in Security Tag Insertion Processing implemented entirely in software.

Turning now to FIG. 3F, Security Tag Insertion Processor (STIP), a diagram illustrating high level insertion of the Security Tag; it consists of Trusted Installer 310, Security Tag Insertion Processing (STIP) 320, and Non Volatile Storage (NVS) Adapter 330; these represent the more detailed diagrams as illustrated in FIGS. 3A, 3B, 3C, and 3D. NVS may refer to any technology used and is not limited to Hard Disk Drive (HDD), Solid State Disk (SSD), or other specific technology.

Turning now to FIG. 3A, Software ST Insertion Processing, a block diagram depicting an embodiment of the present invention illustrating ST insertion processing entirely in software consisting of Trusted Installer 310A, Security Tag Insertion Processor (STIP) 320A, and Non Volatile Storage (NVS) Adapter 330A is shown. The Security Tag Insertion Processor 320A consists of the NOP Utility 321A and the XOR Utility 322A; the NOP Utility 321A uses a UNIX-like patch utility (or equivalent) to insert NOP instructions at the beginning of each instruction block received from Trusted Installer 310A, resulting in the Native Object Code w/ NOP Block Header $Y_1[M]$ format, as depicted in FIG. 2C. The XOR utility 322A by applying the bitwise operator, XOR, with the Security Tag and only the NOP, or with all instructions, resulting in Native Object Code w/ Block Header Identifier $Y_2[M]$ or Unique Object Code w/ Block Header Identifier $Y_3[M]$, as depicted in FIGS. 2D and 2E, respectively. In either case, the resulting object code can be executed only on this device. The command options issued to the Trusted Installer 310A determines what mode of object code format is processed, $Y_2[M]$, or $Y_3[M]$; however, $Y_3[M]$ is the preferred format and is used in the preferred embodiment of the present invention. Additionally, the XOR Utility 322A and NOP Utility 321A are readily available in standard distributions. This implementation may be used for statically defined ST insertion with or without Trust.

Turning now to FIG. 3B, Hardware ST Processing on write to Non Volatile Storage (NVS), a block diagram depicting an alternate embodiment of the present invention with NOP insertion processing in software and ST processing in hardware. The implementation consists of Trusted Installer 310B, Security Tag Insertion Processor (STIP) 320B, and Non Volatile Storage (NVS) Adapter 330B. The Security Tag Insertion Processor 320B consists of the NOP Utility 321B which uses a UNIX-like patch utility (or equivalent) to insert NOP instructions at the beginning of each instruction block received from Trusted Installer 310B, resulting in the Native Object Code w/ NOP Block Header $Y_1[M]$ format, or the Native Object Code w/ 2-NOP Block Header Z[M], as depicted in FIG. 2C and FIG. 2F respectively. In the case of Block Header Z[M], the Variable ST is inserted after the NOP in the header.

The XOR utility 332B then XORs the Security Tag with only the header, or with all instructions, resulting in Native Object Code w/ Block Header Identifier $Y_2[M]$, Unique Object Code w/ Block Header Identifier $Y_3[M]$, or Unique Object Code w/ 2Field Block Header $Z_1[M]$, as depicted in FIGS. 2D, 2E, and 2G, respectively. In either case, the resulting object code can be executed only on this device. The command options issued to the Trusted Installer 310B determines what mode of object code format is processed, $Y_2[M]$, $Y_3[M]$, or $Z_1[M]$. The Configuration Register 334B, ST Buffer 333B, and NOP Utility 321B are initialized during system startup; the value written to the Configuration Register 334B determines what mode of object code format is processed, $Y_2[M]$, or $Y_3[M]$, as well as enabling or disabling the unit. This implementation is appropriate for static NOP processing and statically defined ST insertion with or without Trust.

Turning now to FIG. 3C, Hardware ST Processing on read from Non Volatile Storage (NVS), a block diagram depicting another alternate embodiment of the present invention with NOP insertion processing in software and ST processing in hardware. The implementation consists of Trusted Installer 310C, Security Tag Insertion Processor (STIP) 320C, and Non Volatile Storage (NVS) Adapter 330C. The Security Tag Insertion Processor 320C consists of the NOP Utility 321C which uses a UNIX-like patch utility (or equivalent) to insert NOP instructions at the beginning of each instruction block received from Trusted Installer 310C, resulting in the Native Object Code w/ NOP Block Header $Y_1[M]$ format, or the Native Object Code w/ 2-NOP Block Header Z[M], as depicted in FIG. 2C and FIG. 2F respectively.

When the executable is read from NVS by the Trusted Loader, the XOR Gate 332C then XORs the Security Tag with only the header, or with the header and all instructions, resulting in Native Object Code w/ Block Header Identifier $Y_2[M]$, Unique Object Code w/ Block Header Identifier $Y_3[M]$, or Unique Object Code w/ 2 Field Block Header $Z_1[M]$, as depicted in FIGS. 2D, 2E, and 2G, respectively. In the case of Block Header $Z_1[M]$, the Variable ST is inserted after the NOP in the header prior to the XOR operation. In all cases, the resulting object code can be executed only on this device. The Configuration Register 334C, ST Buffer 333C, and NOP Utility 321C are initialized during system startup; the value written to the Configuration Register 334C determines what mode of object code format is processed, $Y_2[M]$, $Y_3[M]$ or $Z_1[M]$, as well as enabling or disabling the unit. This implementation is appropriate for static NOP processing and dynamically defined ST insertion with or without Trust.

Figure 3D:
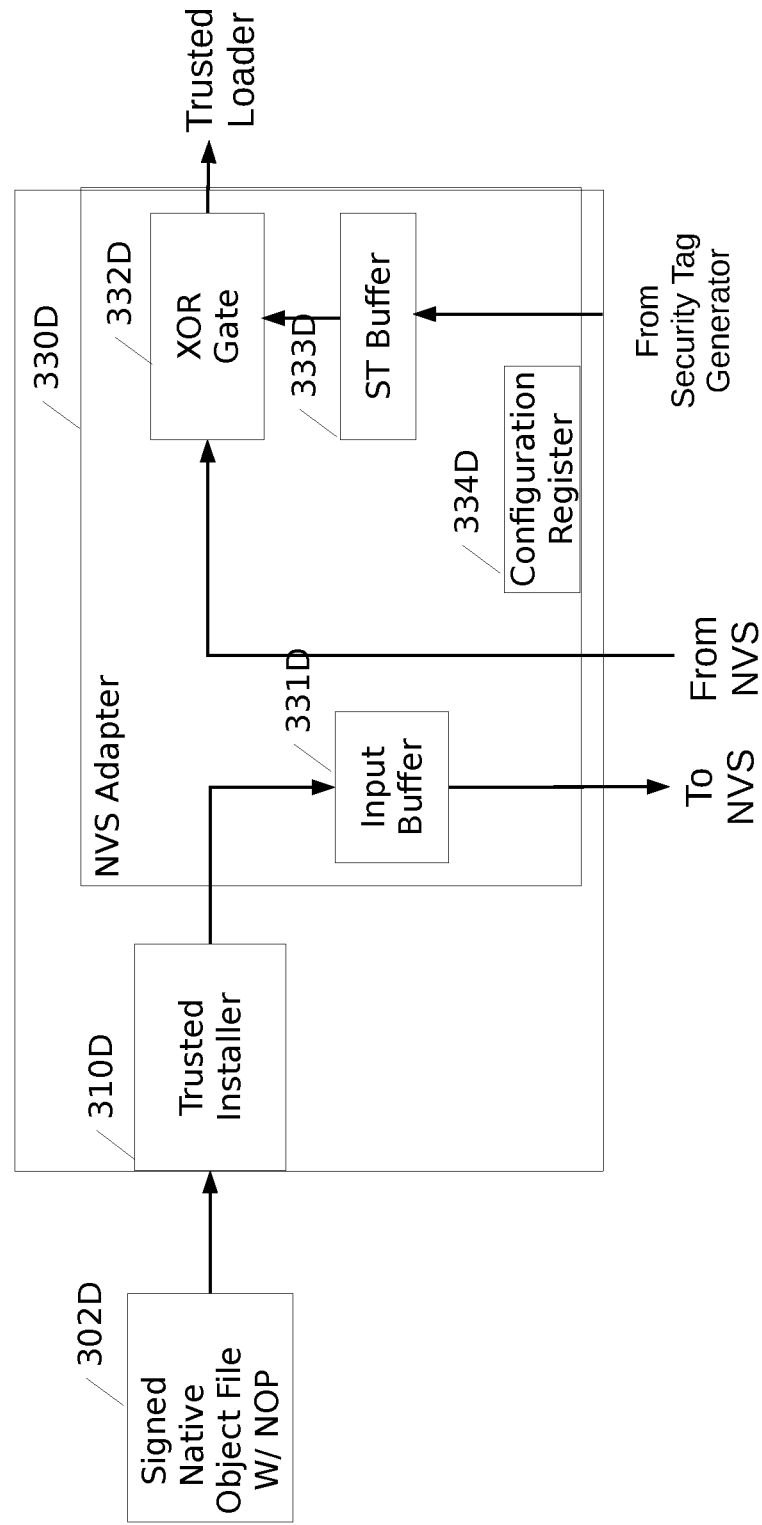
FIG. 3D is a diagram illustrating components used in Security Tag Insertion Processing implemented partially by developer/publisher (Signed Native Object File W/ NOP) and partially by hardware modification to the NVS Adapter with XOR on read from Non Volatile Storage (NVS)
Figure 5A:
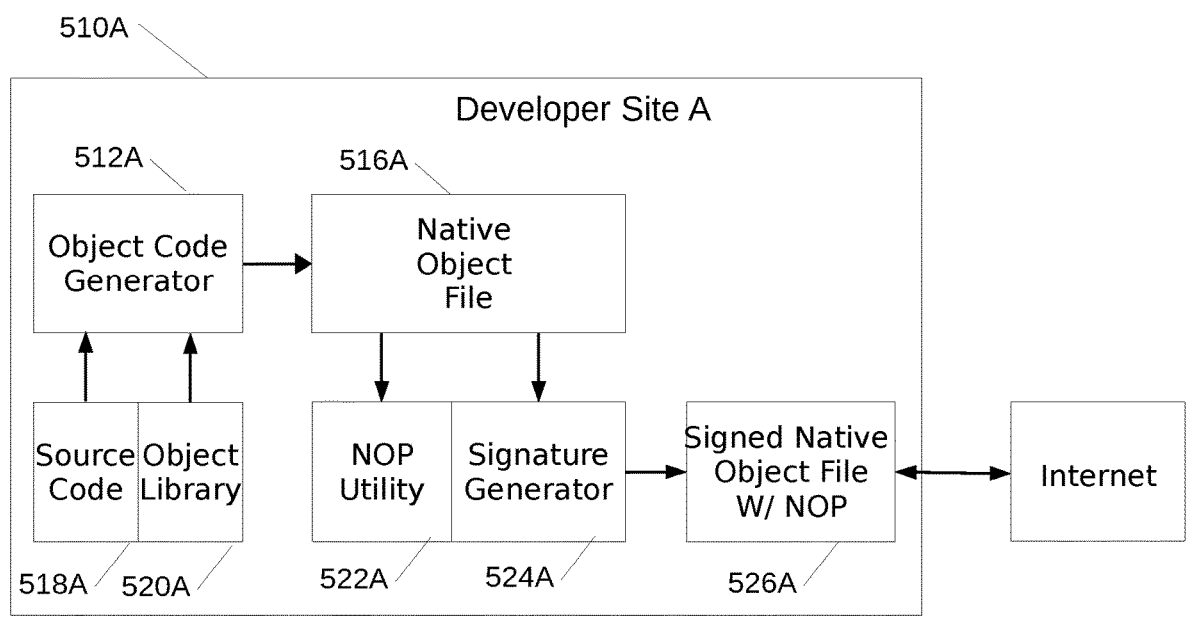
FIG. 5A is a block diagram of a developer site in which the developer performs NOP insertion in each code block.

Turning now to FIG. 3D, Hardware ST NOP Preprocessed, a block diagram depicting another alternate embodiment of the present invention with a single NOP insertion performed by the developer/publisher, as illustrated in FIG. 5A, and ST processing in the (NVS) Adapter 330D hardware. The implementation consists of Trusted Installer 310D, and Non Volatile Storage (NVS) Adapter 330D. The Signed Native Object File W/ NOP 302D has been received in the Native Object Code w/ NOP Block Header $Y_1[M]$ format, as depicted in FIG. 2C and is written to NVS by Input Buffer 331D. When the executable is read from NVS by the Trusted Loader, the XOR Gate 332D then XORs the Security Tag with only the NOP, or with all instructions, resulting in Native Object Code w/ Block Header Identifier $Y_2[M]$ or Unique Object Code w/ Block Header Identifier $Y_3[M]$, as depicted in FIGS. 2D and 2E, respectively. In either case, the resulting object code can be executed only on this device. The command options issued to the Trusted Installer 310D determines what mode of object code format is processed. The Configuration Register 334D, ST Buffer 333D, and NOP Buffer 333D are initialized during system startup; the value written to the Configuration Register 334D determines what mode of object code format is processed, $Y_2[M]$, or $Y_3[M]$, as well as enabling or disabling the unit. This implementation is appropriate only for dynamically defined ST insertion with or without Trust.

Figure 5B:
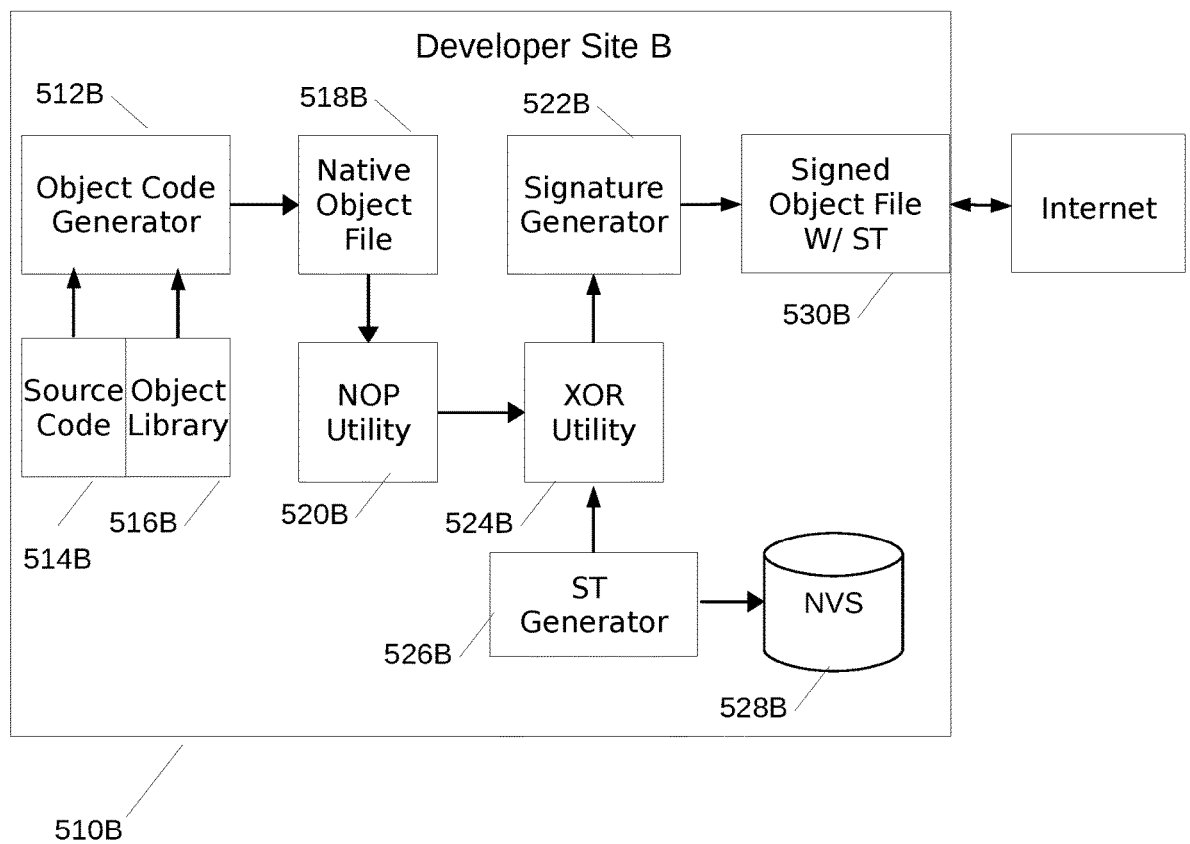
FIG. 5B is a block diagram of a developer site in which the developer performs ST insertion in each code block.

Turning now to FIG. 3E, No Security Tag Insertion Processing, a block diagram depicting another alternate embodiment of the present invention that requires the NOP insertion and ST processing performed by the developer/publisher as illustrated in FIG. 5B. The implementation consists of Trusted Installer 310E and Non Volatile Storage (NVS) Adapter 330E, the input file is stored as received, subject to signature validation by Trusted Installer 310E. This implementation supports two formats, $Y_2[M]$, Native Object Code w/ Block Header Identifier and $Y_3[M]$, Unique Object Code w/ Block Header Identifier, depicted in FIGS. 2D and 2E, respectively. The Security Tag may be transmitted separately via secure link. (not shown) This implementation is appropriate for low cost end user devices where normal Security Tap Input Processing exceeds design goals; it is only for statically defined ST insertion with or without Trust.

Figure 4A:
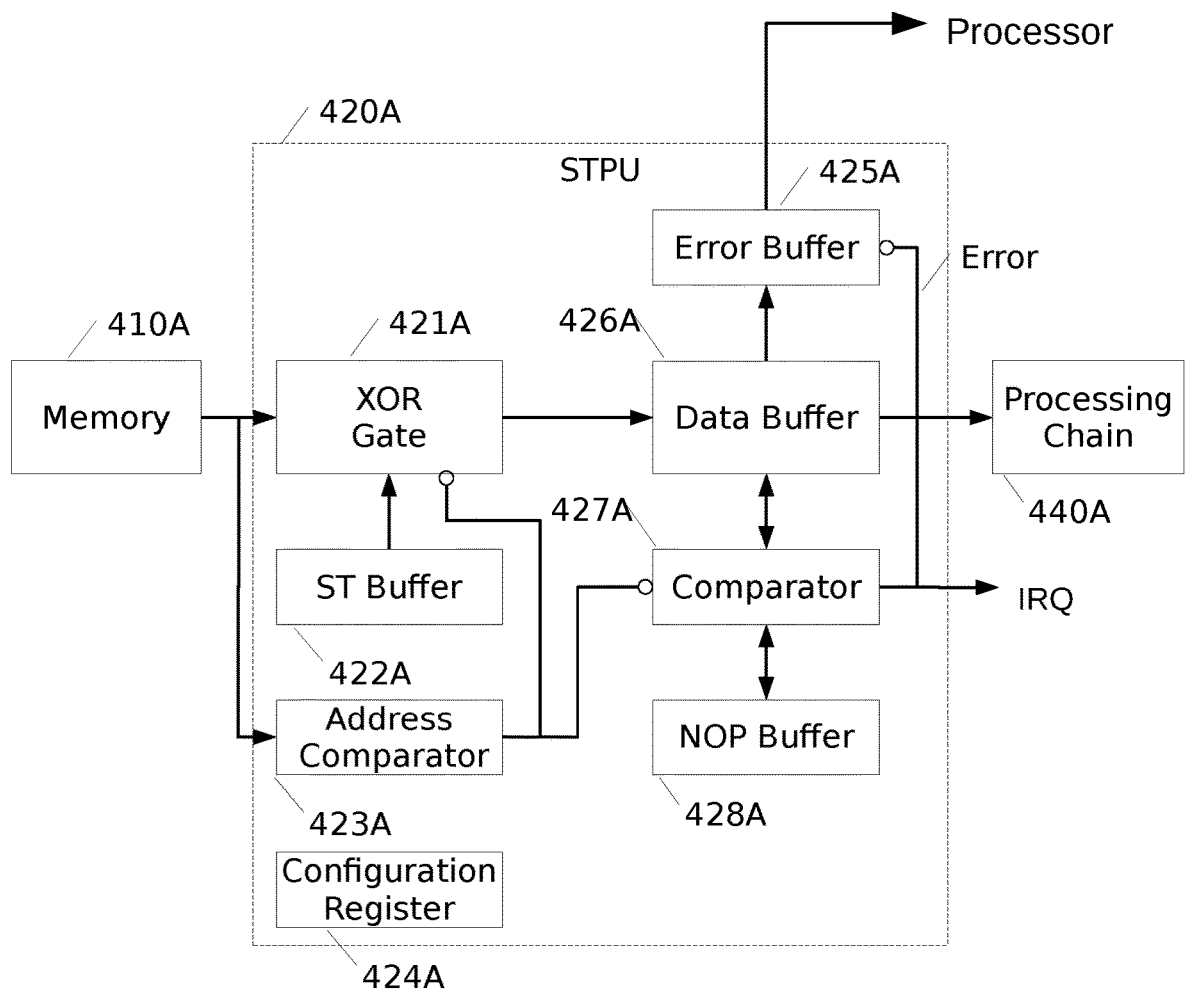
FIG. 4A is a more detailed block diagram of the components used to implement Security Tag Processing Unit (STPU) used to validate the ST where Trust may be encoded in the ST.
Figure 4B:
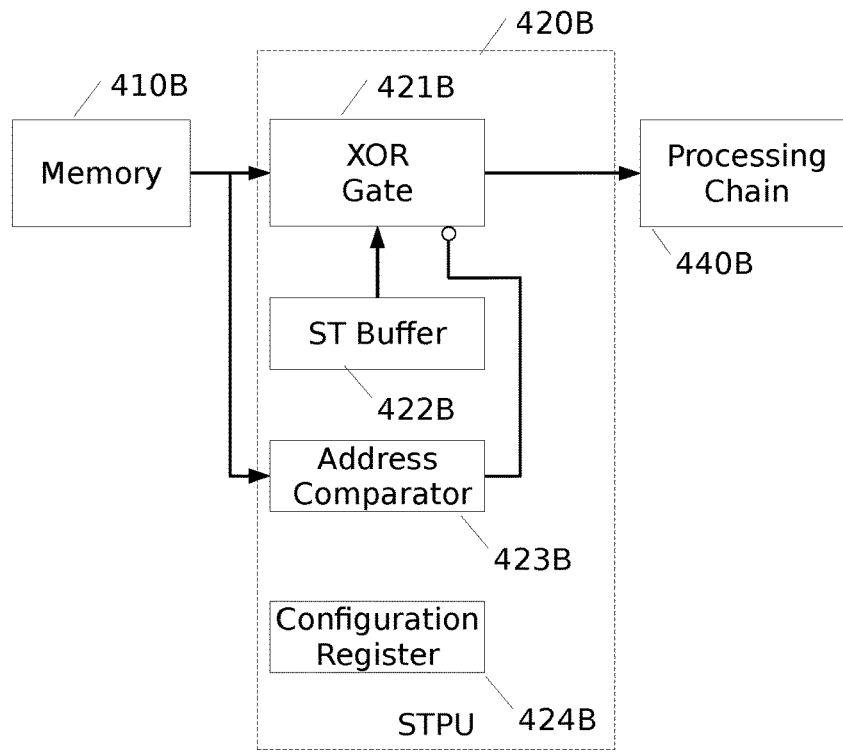
FIG. 4B is a more detailed block diagram of the components used to implement a minimal Security Tag Processing Unit (STPU) used to validate the ST where Trust may be encoded in the ST.
Figure 4C:
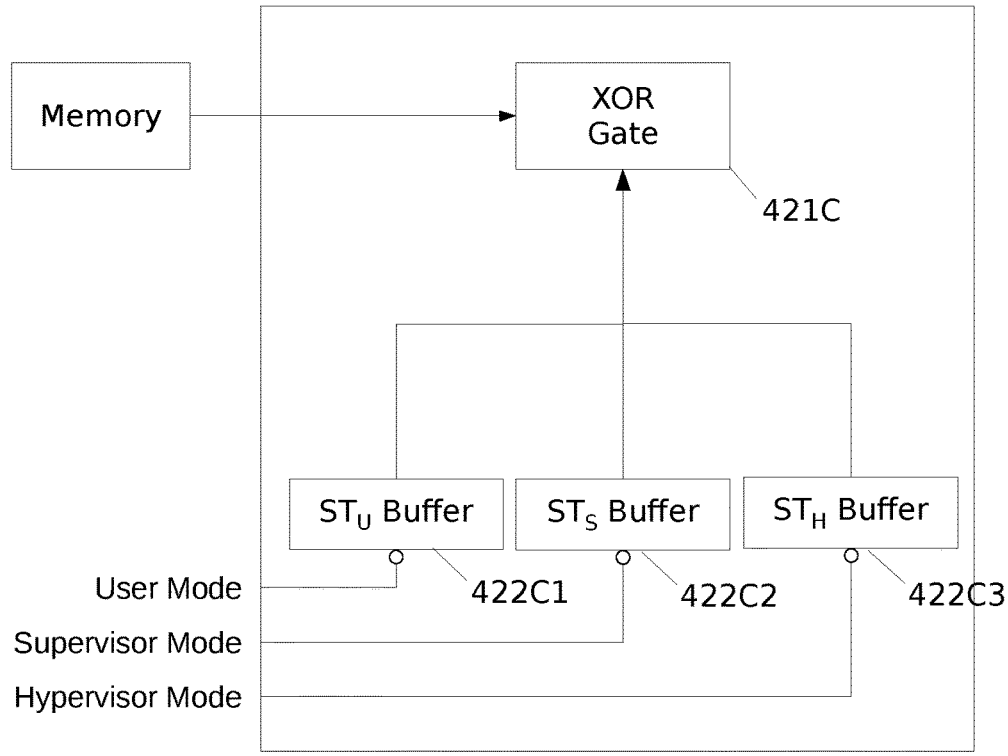
FIG. 4C is an expanded diagram showing ST buffering in systems supporting Security Tags for each privilege level.
Figure 4D:
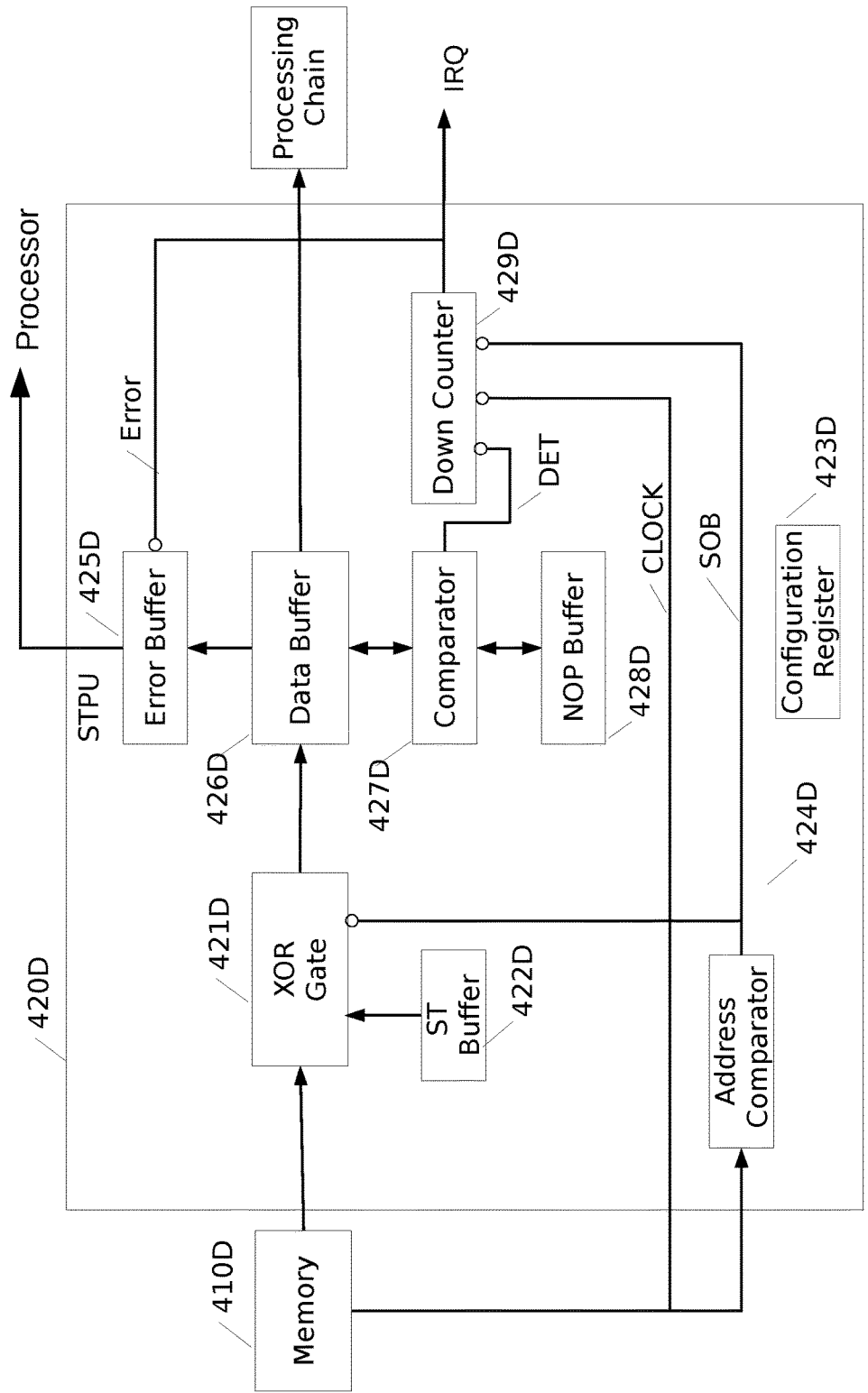
FIG. 4D is a more detailed block diagram of the components used to implement a Counter Mode Security Tag Processing Unit (STPU) used to validate the ST where Trust may be encoded in the ST.
Figure 4E:
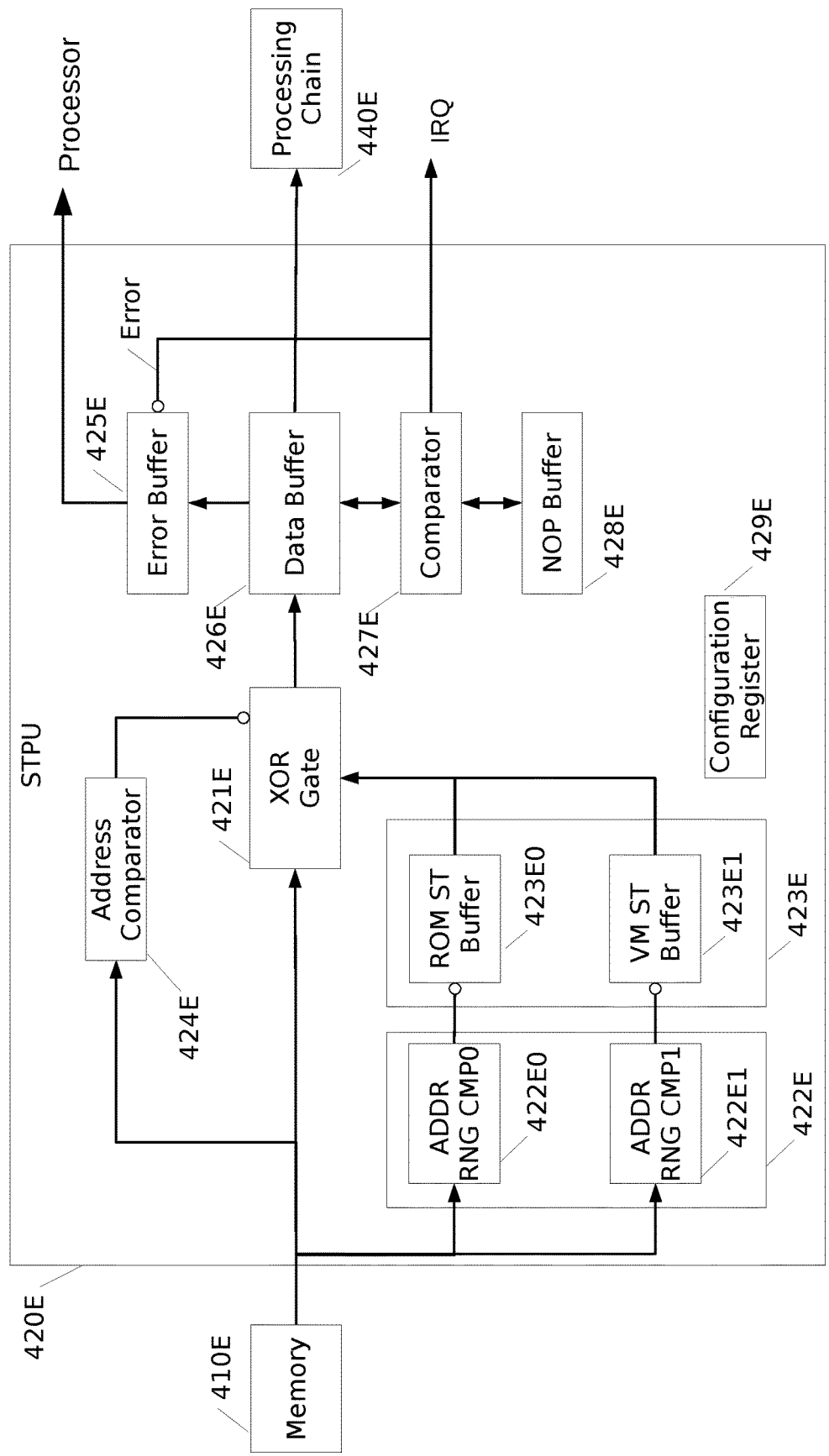
FIG. 4E is an expanded diagram showing ST buffering in systems supporting Security Tags for boot ROM and Volatile Memory.
Figure 4F:
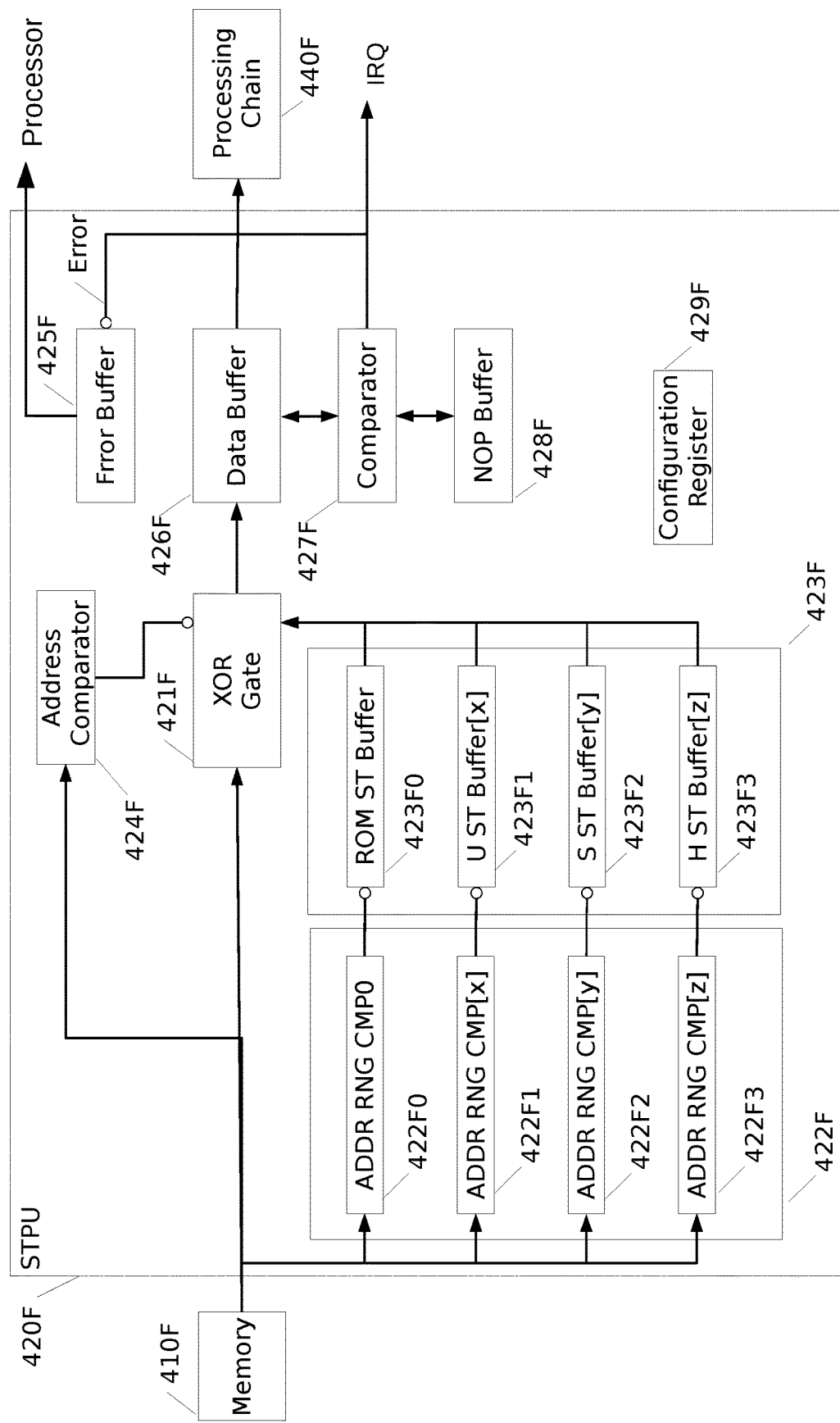
FIG. 4F is an expanded diagram showing ST buffering in systems supporting Security Tags for each user, and each privilege level.
Figure 4G:
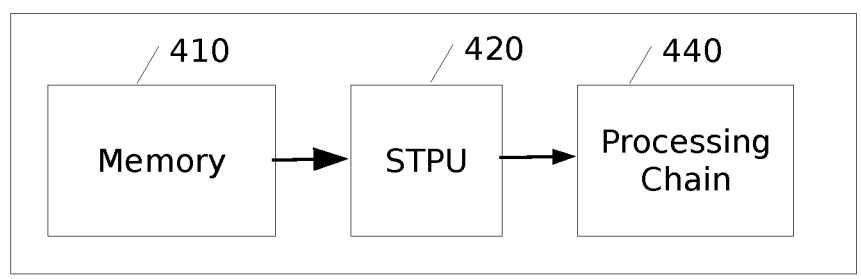
FIG. 4G is a high level block diagram of the components used to implement Security Tag Processing Unit (STPU) used to validate the ST.

Turning now to FIG. 4G, a diagram showing the context of the Security Tag Processing Unit (STPU 650) within End User Device 600 depicted in FIG. 6. FIG. 4G is a diagram illustrating high level processing of the Security Tag; it consists of Memory 410, Security Tag Processing Unit (STPU) 420, and Processing Chain 440; the STPU 420 is then better represented in the more detailed diagrams illustrated in FIGS. 4A, 4B, 4C and 4D. The STPU 420 may be implemented with instruction wide functions or cache line width functions that allow the NOP instruction be placed anywhere within an architected instruction or anywhere within a cache line. Those of ordinary skill in the art will recognize the placement of the NOP in fixed instruction locations may occasionally place the NOP within a tight program loop and result in performance degradation, however, allowing placement anywhere within a cache line can avoid this issue. It is also recognized more hardware is required to support cache line.

Turning now to FIG. 4A, Hardware ST Processing Unit w/ Trust, a diagram showing the preferred embodiment of the STPU 420A, consisting of XOR Gate 421A, ST Buffer 422A, Address Comparator 423A, Configuration Register 424A, Error Buffer 425A, Data Buffer 426A, Comparator 427A, and NOP Buffer 428A. The Configuration Register 424A, ST Buffer 422A, and NOP Buffer 428A are initialized during system startup; the value written to the Configuration Register 424A determines what format of object code is processed, if the processing mode is static or dynamic and if the unit is enabled or disabled. A Security Tag value equal to zero (0) will enable transparent operation, e.g., (A XOR 0=A) no modification of the instruction stream is made and therefore native instructions can be processed. The STPU 420A supports two (2) object code formats, $Y_1[M]$ Format: Native Object Code w/ Block Header Identifier $Y_1[M]$ and $Y_2[M]$ Format: Unique Object Code w/ Block Header Identifier $Y_2[M]$, as depicted in FIGS. 2D and 2E, respectively.

In the preferred embodiment, the STPU 420A receives instructions from Instruction Memory 410A in $Y_2[M]$ format, passes through the XOR Gate 421A where an XOR with the ST is performed on every instruction, resulting in the Y[M] format, as depicted in FIG. 2D. The Y[M] format code is then passed into the Data Buffer 426A where Comparator 427A compares the first instruction in each block to the NOP instruction, contained in NOP Buffer 428A, under control of the Address Comparator 423A. If the comparison is successful, the code block is passed to Processing Chain 440A; otherwise the comparator asserts the error line to latch the contents of the Data Buffer 426A in the Error Buffer 425A as well as asserting the IRQ line to alert the processor errors have occurred. Two (2) types of error may occur, the NOP instruction may not be present, or the Trust bit has been set to Untrusted. When exception processing starts, the processor may read the error buffer to determine which error occurred. The Address Comparator 423A can also be implemented as a programmable instruction address comparator to identify instruction memory from data memory in non-Harvard architectures; thereby identifying instruction address range and start of block. In this case, the programmable instruction address comparators may be updated during context switching, e.g., each time a new task (process) is dispatched. Address Comparator 423A may also be used to differentiate ROM/NVRAM memory used during initialization from program memory used during normal processing. Please refer to FIGS. 4E and 4F for more detail. Comparator 427A may be implemented as a cache-line wide comparator, allowing the NOP be placed anywhere in the cache line. This would allow flexibility in the placement of the NOP within the block. This would be useful if a NOP insertion fell within a tight loop and potentially caused processing delays.

Turning again to FIG. 4A, Hardware ST Processing Unit w/ Trust, in an alternate embodiment, the STPU 420A receives instructions from Memory 410A in $Y_1[M]$ format, passes through the XOR Gate 421A where an XOR with the ST is performed only on the first instruction (or first cache line) under control of Address Comparator 423A, resulting in the Y[M] format, as depicted in FIG. 2D. All other actions are identical and therefore not repeated.

Turning now to FIG. 4B, Minimal Hardware ST Processing Unit, a diagram showing an alternate embodiment of the STPU 420B, consisting of XOR Gate 421B, ST Buffer 422B, Address Comparator 423B, and Configuration Register 424B. The Configuration Register 424B and ST Buffer 422B are initialized during system startup; the value written to the Configuration Register 424B enables or disables operation. A Security Tag value equal to zero (0) will enable transparent operation, e.g., (A XOR 0=A) no modification of the instruction stream is made and therefore native instructions can be processed. The STPU 420B supports one (1) object code format, $Y_2[M]$ Native Object Code w/ Block Header Identifier, as depicted in FIG. 2D. In this alternate embodiment, the STPU 420B receives instructions from Memory 410B in $Y_2[M]$ format, under control of the Address Comparator 423B. Instructions then pass through the XOR Gate 421B where an XOR with the ST is performed on the first instruction in the block, resulting in Native Object Code w/ NOP Block Header in $Y_1[M]$ format, as depicted in FIG. 2C. The $Y_1[M]$ format code is then passed to the Processing Chain_440B. Processing of the instruction stream will proceed normally for valid code; however, malware or untrusted code, where trust is encoded in ST, will generate illegal instructions in the processor. The Address Comparator 423B can also be implemented as a programmable instruction address comparator to identify instruction memory from data memory in non-Harvard architectures; thereby identifying instruction address range and start of block. In this case, the programmable instruction address comparators may be updated during context switching, e.g., each time a new task (process) is dispatched. Address Comparator 423B may also be used to differentiate ROM/NVRAM memory used during initialization from program memory used during normal processing. Please refer to FIGS. 4E and 4F for more detail.

Turning now to FIG. 4C, Privilege Level ST Buffering, a diagram showing an alternate implementation of the buffer holding the Security Tag (ST) consisting of XOR Gate 421C, $ST_U$ Buffer 422C1, $ST_S$ Buffer 422C2, and $ST_H$ Buffer 422C3. XOR Gate 421C is shown to clarify the diagram in relation to the previous diagram. The $ST_U$ Buffer maintains the user privilege level ST, the $ST_S$ Buffer maintains the supervisor privilege level ST, and the $ST_H$ Buffer maintains the hypervisor privilege level ST; all are initialized during system startup in a static mode system. In a dynamic mode system, the user privilege level buffer is initialized and updated when a new process (task) is dispatched. During runtime, privilege level switching is automatic using hardware signals derived (directly or indirectly) from the processor privilege level. A Security Tag value equal to zero (0) will enable transparent operation, e.g., (A XOR 0=A) no modification of the instruction stream is made and therefore native instructions can be processed.

Turning now to FIG. 4D, CTR Mode Hardware ST Processing Unit w/ Trust, a diagram depicting an alternate embodiment of the STPU 420D, consisting of XOR Gate 421D, ST Buffer 422D, Address Comparator 424D, Configuration Register 423D, Error Buffer 425D, Data Buffer 426D, Comparator 427D, NOP Buffer 428D and Down Counter 429D. This implementation allows the NOP instruction be placed anywhere within each block and will assert an error if there is no NOP detected within each bock. Those of ordinary skill in the art will recognize the placement of the NOP in fixed architectural locations may occasionally place the NOP within a tight program loop and result in performance degradation, however, allowing variable placement avoids this issue. The Configuration Register 423D, ST Buffer 422D, NOP Buffer 428D and Down Counter 429D are initialized during system startup; the value written to the Configuration Register 423D determines what format of object code is processed, if the processing mode is static or dynamic and if the unit is enabled or disabled. A Security Tag value equal to zero (0) will enable transparent operation, e.g., (A XOR 0=A) no modification of the instruction stream is made and therefore native instructions can be processed. The Down Counter 429D is preset with the block size. The STPU 420D supports two (2) object code formats, $Y_2[M]$ Format: Native Object Code w/ Block Header Identifier $Y_2[M]$ and $Y_3[M]$ Format: Unique Object Code w/ Block Header Identifier $Y_3[M]$, as depicted in FIGS. 2D and 2E, respectively.

In this alternate embodiment, the STPU 420D receives instructions from Instruction Memory 410D in $Y_2[M]$ format, passes through the XOR Gate 421D where an XOR with the ST is performed on every instruction, resulting in the Y[M] format, as depicted in FIG. 2D. The Y[M] format code is then passed into the Data Buffer 426D where Comparator 427D compares all instructions in each block to the NOP instruction, contained in NOP Buffer 428D, under control of the Address Comparator 424D. In this alternate embodiment, the Address Comparator 424D detects the start of block (SOB) and resets the Down Counter 429D at the beginning of each block. Additionally, if the NOP instruction is detected (DET), e.g., the comparison is successful, the Down Counter 429D is reset to its preset value, otherwise the Down Counter 429D continues to decrement under control of CLOCK, derived from the instruction stream from Memory 410D. If Down Counter 429D reaches zero, it asserts the error line to latch the contents of the Data Buffer 426D in the Error Buffer 425D as well as asserting the IRQ line to alert the processor errors have occurred. Two (2) types of error may occur, the NOP instruction may not be present anywhere within a block, or the Trust bit has been set to Untrusted. When exception processing starts, the processor may read the error buffer to determine which error occurred. The Address Comparator 424D can also be implemented as a programmable instruction address comparator to identify instruction memory from data memory in non-Harvard architectures; thereby identifying instruction address range and start of block. In this case, the programmable instruction address comparators may be updated during context switching, e.g., each time a new task (process) is dispatched.

Turning now to FIG. 4E, Address Range Mode ST Processing Unit with Trust, a diagram depicting an alternate implementation consisting of Memory 410E, Security Tag Processing Unit (STPU) 420E, and Processing Chain 440E. This alternate implementation is intended to solve timing issues associated with system startup initialization caused by change of control from firmware (e.g., boot ROM) to software stored in volatile RAM. In most systems it is preferable not to modify firmware, therefore, the firmware would remain in the native instruction set as depicted in FIG. 2A requiring the ROM ST Buffer value be set to zero (0). This is necessary for some microprocessors that have branch prediction and instruction prefetch controllers that make the exact timing for the switching of Security Tag values difficult, if not impossible. This implementation solves that issue in cases where necessary, the ST values are switched automatically based on the address ranges of the firmware in ROM and volatile memory, which are both known.

The STPU 420E consists of Address Range Comparator Block 422E, ST Buffer Block 423E, XOR Gate 421E, Address Comparator 424E, Error Buffer 425E, Data Buffer 426E, Comparator 427E, NOP Buffer 428E and Configuration Register 429E. The ST Buffer Block 423E consists of ROM ST Buffer 423E0 and VM ST Buffer 423E1 that maintains the ROM and Volatile Memory ST values. The ROM ST Buffer 423E0 is initialized to zero (0) at reset by hardware, or may utilize switches or jumpers to set its value which would allow the firmware in ROM run native code as depicted in FIG. 2A, or run modified code as depicted in FIG. 2D or FIG. 2E which would require a utility be provided to read ROM, modify, and rewrite.

A Security Tag value equal to zero (0) will enable transparent operation so unmodified ROM code be used. e.g., (A XOR 0=A) no modification of the instruction stream is made and therefore native instructions can be processed.

Address Range Comparator Block 422E consists of ADDR RNG CMP0 422E0 and ADDR RNG CMP1 422E1, containing the start and end of ROM and Volatile Memory respectively. ADDR RNG CMP0 422E0 may be initialized by NVRAM, utilize switches, or use jumpers to set its value. ADDR RNG CMP1 422E1 may also be initialized by NVRAM, utilize switches, or use jumpers to set its value, or be programmed during system startup by the boot ROM prior to ROM giving control to the program located in volatile memory.

When a memory address falling within the ROM memory is presented on the bus, ADDR RNG CMP 0 422E0 enables Boot ST Buffer Boot 423E0, similarly, when a memory address falling within the Volatile memory is presented on the bus, ADDR RNG CMP 1 422E1 enables VM ST Buffer 423E1. In this manner, separate Security Tags are automatically used to transition between Boot ROM phase and normal processing phase based on the address ranges.

In this alternate configuration, Address Comparator 424E detects the start of block address, otherwise, processing is otherwise identical to FIG. 4A. Additionally, the ST Buffer 422D depicted in FIG. 4D may be replaced by ST Buffer Block 423E and Address Range Comparator Block 422E.

Turning now to FIG. 4F, Address Range Mode ST Processing Unit with Trust, a diagram showing an alternate implementation of the ST Buffer consisting of Memory 410F, Security Tag Processing Unit (STPU) 420F, and Processing Chain 440F.

The STPU 420F consists of Address Range Comparator Block 422F, ST Buffer Block 423F, XOR Gate 421F, Address Comparator 424F, Error Buffer 425F, Data Buffer 426F, Comparator 427F, NOP Buffer 428F and Configuration Register 429F. The ST Buffer Block 423F consists of ROM ST Buffer 423F0, an array of x, U (User privilege level) ST Buffers 423F1, and array of y, S (Supervisor privilege level) ST Buffers 423F2 and an array of z, H (Hypervisor privilege level) ST Buffers 423F3.

ROM ST Buffer 422F0 is initialized to zero (0) at reset by hardware, or may utilize switches or jumpers to set its value which would allow the firmware in ROM run native code as depicted in FIG. 2A, or run modified code as depicted in FIG. 2D or FIG. 2E which would require a utility be provided to read ROM, modify, and rewrite.

A Security Tag value equal to zero (0) will enable transparent operation so unmodified ROM code be used. e.g., (A XOR 0=A) no modification of the instruction stream is made and therefore native instructions can be processed.

Address Range Comparator Block 422F consists of ADDR RNG CMP0 422F0 and three arrays of address range comparators ADDR RNG CMP[x] 422F1, ADDR RNG CMP[y] 422F2, and ADDR RNG CMP[z] 422F3. ADDR RNG CMP0 422F0 contains the start and end of ROM, and may be initialized by NVRAM, utilize switches, or use jumpers to set its value.

The arrays of address range comparators ADDR RNG CMP[x] 422F1, ADDR RNG CMP[y] 422F2, and ADDR RNG CMP[z] 422F3 contain the address ranges of user, supervisor, and hypervisor privilege level software. These address range comparators are initialized at system startup as necessary. In systems not supporting a hypervisor, the address range comparator minimum and maximum values may be set to the top of memory address range, effectively disabling this mode.

When a memory address falling within the ROM memory is presented on the bus, ADDR RNG CMP 0 422F0 enables Boot ST Buffer Boot 423F0, similarly, when a memory address falling within the Volatile memory is presented on the bus, ADDR RNG CMP[x] 422F1, ADDR RNG CMP[y] 422F2, or ADDR RNG CMP[z] 422F3 enable the corresponding ST Buffer. In this manner, separate Security Tags are automatically used to transition between Boot ROM phase and normal processing phase based on the address ranges.

In this alternate configuration, Address Comparator 424F detects the start of block address, otherwise, processing is otherwise identical to FIG. 4A. Additionally, the ST Buffer 422D depicted in FIG. 4D may be replaced by ST Buffer Block 423F and Address Range Comparator Block 422F.

Figure 5C:
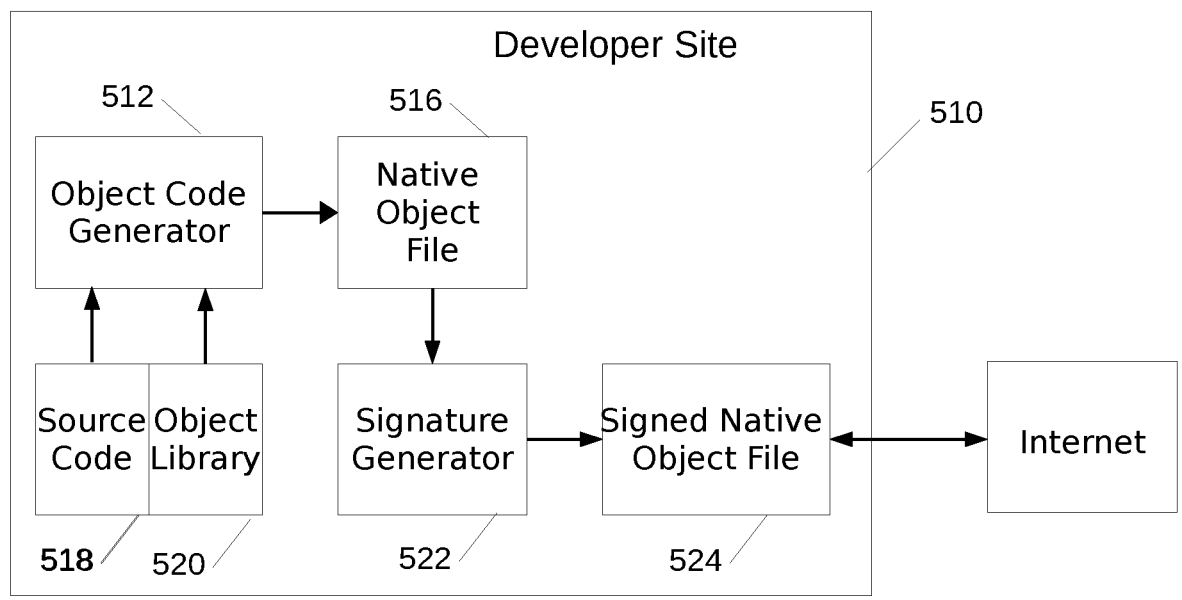
FIG. 5C is a block diagram of a typical developer site.

With reference now to FIG. 5C, Developer Site 510, and FIG. 6, End User Device 600, diagrams illustrating the deployment of software from the developer to the end user, depicted in accordance with a preferred embodiment of the present invention.

FIG. 5C, Developer Site, illustrates a simplified example of a typical development environment showing the components used to generate code section X[N] as illustrated in FIG. 2A. As illustrated, the Developer Site 510 includes the Object Code Generator 512, which compiles the Source Code 518 and links with object code located in the Object Library 520 to generate Native Object File 516, and Signature Generator 522 which generates a cryptographic signature for Native Object File 516; the signature is stored in the ELF .signature segment record within the Signed Native Object File 524. The Signed Native Object File 524 is transmit securely to an end user device via TLSv1.2, or equivalent, over an Internet link. When received the source is stored in an optional ELF source field, .source, so later processing may determine trust if the .signature field is not present. If neither field is present or blank, trust should be set to UNTRUSTED.

With reference now to FIG. 5A, Developer Site A, illustrates a simplified example of a development environment showing the components used to generate code section $Y_1[M]$ as illustrated in FIG. 2C. As illustrated, the Developer Site A 510A includes the Object Code Generator 512A, which compiles the Source Code 518A and links with object code located in the Object Library 520A to generate Native Object File 516A, NOP Utility 522A that inserts NOP instructions, and Signature Generator 524A which generates a cryptographic signature for Signed Native Object File w/ NOP (intermediate file not shown); the signature is stored in the ELF .signature segment record within the Signed Native Object File w/ NOP 526A. The Signed Native Object File w/ NOP 526A is transmit securely to end user devices via TLSv1.2, or equivalent, over an Internet link. When received the source is stored in an optional ELF source field, .source, so later processing may determine trust if the .signature field is not present. If neither field is present or blank, trust should be set to UNTRUSTED.

With reference now to FIG. 5B, Developer Site B, illustrates a simplified example of a development environment showing the components used to generate code section $Y_2[M]$ or $Y_3[M]$ as illustrated in FIGS. 2D and 2E, respectively. As illustrated, the Developer Site A 510B includes the Object Code Generator 512B, which compiles the Source Code 514B and links with object code located in the Object Library 516B to generate Native Object File 518B, NOP Utility 520B that inserts NOP instructions, XOR Utility 524B that performs the XOR operation with the Security Tag (ST) generated in the ST Generator 526B, and Signature Generator 522B which generates a cryptographic signature for Signed Native Object File w/ ST (intermediate file not shown); the signature is stored in the ELF .signature segment record within the Signed Native Object File w/ ST 530B. Also shown is Non-Volatile Storage (NVS) 528B where the ST may be securely stored by the developer/publisher for future use. For each end user device, a unique ST is generated and inserted into the code, then the resulting Signed Native Object File w/ ST 530B is transmit securely to that end user device via TLSv1.2, or equivalent, over an Internet link. When received the source is stored in an optional ELF source field, .source, so later processing may determine trust if the signature field is not present. If neither field is present or blank, trust should be set to UNTRUSTED.

Turning again briefly to FIGS. 5A, 5B, and 5C, those of ordinary skill in the art will recognize that there are different methodologies available for signing binary files or packages such as in the RPM format; the description contained herein is an example as any other valid methodology may be used; however, this is outside the scope of the present invention.

Turning now to FIGS. 6, 3A, and 4A, diagrams illustrating components used in the receipt and processing of software used to prevent vulnerabilities to code injection attacks is depicted in accordance with the preferred embodiment of the present invention.

With reference now to FIG. 6, the End User Device 600 includes the Trusted Computing Base 610, Data Memory 640, Instruction Memory 642, the Security Tag Processing Unit (STPU) 650, External Cache 660, the Processor 670, and the Security Tag Generator 680; also shown is the Signed Native Object File 602 received via a TLSv1.2 (or equivalent) link and Application Layer Programs 604 which provides a load path for programs such as email, browser, and USB file system interface. In this diagram, the Security Tag Processing Unit (STPU) 650, is depicted between Instruction Memory 642 and External Cache 660; however, the STPU could be implemented anywhere prior to the Instruction Pipeline 676 where instruction decoding is performed, as design dictates.

Trusted Computer Base 610 is a portion of the data processing system that is trusted to be free of exploitable vulnerabilities as well as any type of malicious code and is in a physically secure environment safe from tampering; it includes the Trusted Installer 612 (code installation program), Security Tag Insertion Processor 614, Non Volatile Storage (NVS) Adapter 616, NVS 620, and Trusted Loader 630. The Trusted Installer 612, Security Tag Insertion Processor 614, and Non Volatile Storage (NVS) Adapter 616 are shown in block 618 additional details are shown in FIG. 3A and described in that section above.

The NVS 620 and NVS Adapter 616 can be implemented as any Non-Volatile Storage (NVS) device and adapter as required. In this example, the Signed Native Object File 602 to be installed, processed and executed is a signed binary file in an executable ELF format.

In this example, the Installer 612 receives Signed Native Object File 602 from various external sources such as DVD, LAN, WAN, USB, or other device. e.g., the native instruction format is the architected code as published by a processor manufacturer such as IBM. e.g., Power ISA™ Version 3.0B; the Power Instruction Set Architecture (ISA) Version 3.0B is a specification that describes the architecture used for the IBM POWER9 processor. Those of ordinary skill in the art will recognize that installation may involve other methodologies such as grouping files together in packages, such as RPM, then signing the entire package rather than each file.

The Trusted Installer 612 is responsible for the validation of the Signed Native Object File 602 using the embedded digital signature contained within the .signature section in the ELF file, calling STIP 614, writing File 602 to NVS 620, File 622 via NVS Adapter 616, calculating a SHA-3 hash of the output from STIP 614, writing the object code and hash to NVS 620, Files 624 and 626; both via NVS Adapter 616. Additionally, the Trusted Installer 612 is responsible for completing the .source field in the ELF file. In this preferred embodiment, the processing performed in STIP 614 is illustrated in FIG. 3A and explained above; its output is $Z_2[M]$, Unique Object Code w/ Block Header Identifier.

The Trusted Loader 630 is responsible for the validation of files from Application Layer Programs 604 using the digital signature (.signature) and source (.source) provided, if any. If present, the Trusted Loader 630 performs analysis of the digital signature and source and assigns either simple trust or multilevel trust depending on the object code format; unsigned files with no source should be UNTRUSTED. Once trust has been established, it is XORed into the ST field or Variable ST field.

The Security Tag Generator 680 requires a random number of sufficient entropy be provided; in this illustrative example, the Processor 670 Random Number Generator (RNG) 678 fulfills this function; although, any RNG that provides the required entropy can be used. The Security Tag Generator 680 provides the post-processing required by the selected RNG source and can be used in static or dynamic environments. Post-processing can dynamically include additional attributes such as trust, privilege level, Process ID, Thread ID, or other as design requires; however, attributes other than trust may require additional hardware to process and are not detailed.

When binary File 624 is selected for execution, the Trusted Loader 630 validates the binary File 624 using its SHA-3 hash stored in File 626 and loads it into Memory 640. During this load operation, the Trusted Loader 630 first reads the header information from binary File 624, makes multiple system calls to allocate instruction (code) and data memory using that information, then reads the code, data, and other sections specified by the header and stores in the code or data memory already allocated. When execution begins, instructions are read from instruction memory 642 in the Unique Object Code w/ Block Header Identifier $Y_3[M]$ format, as depicted in FIG. 2E, and enter the Security Tag Processing Unit (STPU) 650; additional details of the STPU are shown in FIG. 4A and described in that section above. In the XOR stage 654 of the Security Tag Processing Unit (STPU) 650, the bitwise operator, XOR, with the ST (written to XOR Stage 654 during initialization) is performed on every instruction, resulting in the Native Object Code w/ NOP Block Header $Y_1[M]$ format, as depicted in FIG. 2I. The $Y_1[M]$ format code is then passed into the Comparator 652 which compares the first instruction in each block to a NOP instruction in this illustrative example. If the comparison is successful, the code block is passed to External Cache 660, comprised of Cache 662 and Cache Bypass Unit 664, and on to the Processor 670 Internal Cache 671 comprised of Cache 672 and Cache Bypass Unit 674, and on to the Instruction Pipeline 676; otherwise the comparator asserts the IRQ line and the processor enters exception processing. Illegal instructions are not allowed to enter the External Cache 660, therefore, no external or internal cache flush, or instruction pipeline flush are necessary.

Computer systems must deal with complex interactions during initialization; therefore, the mechanism of the present invention provides that a Security Tag value equal to zero (0) will enable transparent operation, e.g., (A XOR 0=A) no modification of the instruction stream is made and therefore native instructions can be processed.

The effect of this methodology is to change the instruction architecture of every machine it is deployed upon, and make the attacks outlined statistically impossible; furthermore, the strength of this security function can be varied by varying block size to match the attack potential and price targets for systems ranging from IoT devices, embedded controllers, desktops, large servers, mainframe systems, or any system deemed potentially vulnerable to attack by those methods listed above. In particular, the mechanism of the present invention exploits a vulnerability in code injection attacks by XORing a unique locally generated ST with each instruction upon installation or valid update of the trusted code base, including the NOP instruction inserted in each block of instructions. Those of ordinary skill in the art will recognize that the frequency of the NOP within the instruction stream may optimized during system design and that the position within the instruction block format may also be variable. In this manner, each instance of the data processing system has unique local instructions as well as a unique system identifier (NOP XOR ST) making each block of instructions machine unique and unknown to an attacking program.

Each block in the depicted examples is n instructions in length with an NOP instruction inserted in each block, an instruction that by definition will cause no action when executed by the processor. Those of ordinary skill in the art will recognize that the size of block (n) chosen may vary depending on the implementation; however, because a NOP does not perform useful work, every NOP is overhead which will limit the minimum block size n. Block sizes of 256 instructions would have a negligible overhead of 0.4%, even if the NOP was not discarded in the instruction decoder. The details of the fields contained in each instruction has no effect on the present invention and therefore not described other than to mention post-processing of the Security Tag may take these fields into consideration.

If a code injection attack is attempted, foreign code may first be written to Memory 640 for execution; however, attackers must know the Security Tag value, which is different for every end user device, as well as the placement of the NOP instruction within each block of instructions. If attackers were able to guess the position of the NOP instruction within the code block, they must guess the Security Tag value; otherwise, the comparison to NOP performed in the STPU Comparator 652 will fail. The random nature of the security tag value is statistical in nature; in the case of a 32-bit instruction and Security Tag, an attacker has a 1 in $2^{32}$ chance of guessing the correct Security Tag value, making a code injection attack statistically impossible. Although it is beyond the scope of this invention, it is important to note that adequate entropy of the random number used to generate the security tag is a critical system design consideration.

The Security Tag Processing Unit 650 requires a relatively small hardware modification to existing architectures requiring only a few gates to implement; it is estimated that the additional circuitry will be a negligible cost impact and could be stand-alone, or integrated into existing cache or memory controller. The additional software processing requires by the STIP 614 results in a small installation time overhead.

Figure 7A:
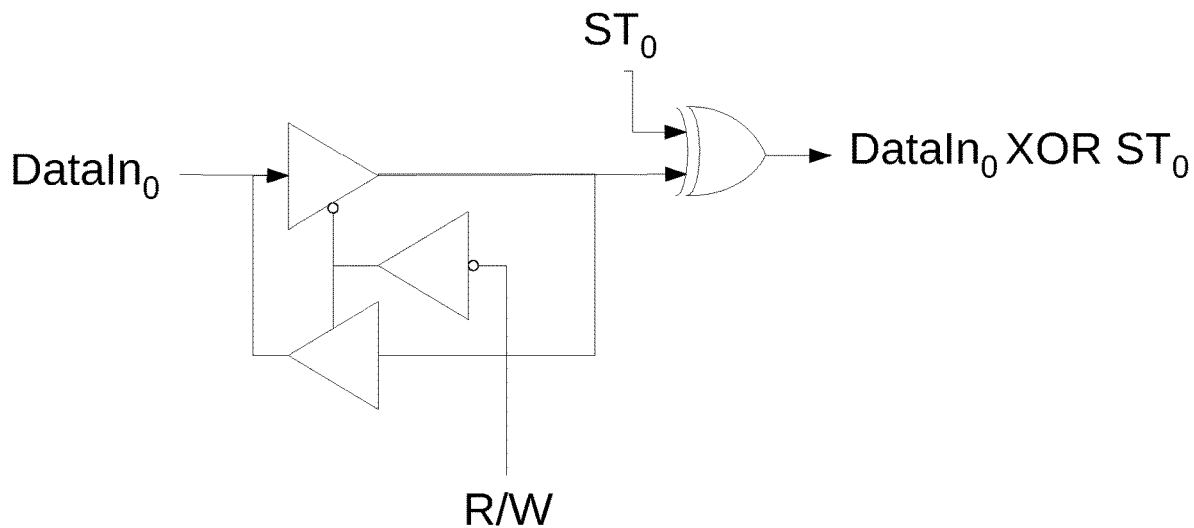
FIG. 7A is a schematic diagram showing one bit of a Bidirectional Bus Buffer during a read cycle.
Figure 7B:
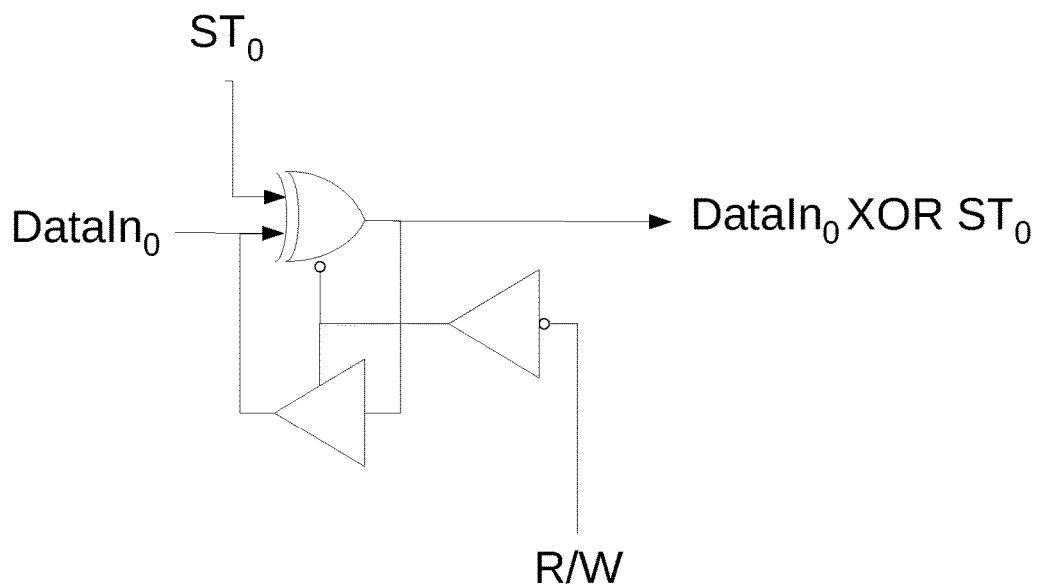
FIG. 7B is a schematic diagram showing one bit of a Bidirectional Bus Buffer with XOR during a read cycle.

With reference now to FIG. 7A, a schematic diagram showing one bit of a typical bidirectional bus buffer on $DataIn_0$ used to read from memory or write to memory followed by an bitwise XOR with $ST_0$, and FIG. 7B, a diagram showing an improved method where the read buffer is replaced with an XOR gate, rather than adding the necessary XOR gate in series which adds additional delay. The improved method may be used throughout the present invention to remove delays associated with the addition of the necessary XOR gate.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 10 and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Definitions

| | |
|---|---|
| Advanced Persistent Threat | A set of stealthy and continuous computer hacking processes, often orchestrated by nation-states and organized crime, targeting a specific entity, usually organizations and/or nations for business or political motives; it requires a high degree of covertness over a long period. |
| APT | See Advanced Persistent Threat |
| Attack surface | The sum of the attack vectors where a threat agent can try to enter data to or extract data from an environment. |
| Attack vector | A path or means by which a threat agent can gain access to a computer system in order to deliver malware. Attack vectors enable threat agents to exploit system vulnerabilities, including the human element; these include viruses, e-mail attachments, removable media, Web pages, pop-up windows, instant messages, chat rooms, and deception. |

-continued

| | |
|---|---|
| CNSS | See Committee on National Security Systems |
| Committee on National Security Systems | A United States Government (USG) forum responsible for setting national-level Information Assurance policies, directives, instructions, operational procedures, guidance and advisories for USG departments and agencies for the security of National Security Systems through the CNSS Issuance System. |
| Developer | The company that writes, debugs, compiles, links, and tests source code to be executed (run) on a target computer system; they may also build the hardware that makes up the computer system. |
| End User | The person that a software program or hardware device is designed for. |
| Enumeration | A complete, ordered listing of all the items in a collection. The term is commonly used to refer to a listing of all of the elements of a set. |
| Federal Information Processing Standards | Publicly announced standards developed by the United States federal government for use in computer systems by non-military government agencies and government contractors. |
| FIPS | See Federal Information Processing Standards |
| IAS | See Intrusion Analysis Software |
| Internet of Things device | A device having a unique identifier, usually an IP address, and the ability to transfer data over a network without requiring human-to-human or human-to-computer interaction that is connected via the Internet into a system of interrelated computing devices. |
| Intrusion Analysis Software | Software designed to analyze possible security breaches by malware attempting to compromise the confidentiality, integrity or availability of a resource; then, take actions as directed by the system or security administrator. |
| IoT | Internet of Things |
| IoT device | See Internet of Things device |
| Malware | Any software used to disrupt computer operations, gather sensitive information, gain access to private computer systems, or display unwanted advertising. |
| Memory Management Unit | A hardware device that provides support required by the operating system to allow multiple independently compiled programs to run simultaneously and transparently, enforces memory protection, and enforces separation of user and kernel space, and under operating system control, provides a cycle-by-cycle (real time) translation between multiple virtual address spaces and the physical memory address space(s). |
| MMU | See Memory Management Unit |
| NAS | See National Airspace System |
| National Airspace System | The airspace, navigation facilities and airports of the United States along with their associated information, services, rules, regulations, policies, procedures, personnel and equipment. |
| National Information Assurance Partnership | A United States government initiative to meet the security testing needs of both information technology consumers and producers that is operated by the NSA, and was originally a joint effort between NSA and the NIST. |
| National Institute of Standards and Technology | A United States government non-regulatory federal agency within the U.S. Department of Commerce; its mission is to promote U.S. innovation and industrial competitiveness by advancing measurement science, standards, and technology in ways that enhance economic security and improve our quality of life. |
| National Security Agency | An intelligence organization of the United States government, responsible for global monitoring, collection, and processing of information and data for foreign intelligence and counterintelligence. |

-continued

| | |
|---|---|
| NIAP | See National Information Assurance Partnership |
| NIST | See National Institute of Standards and Technology |
| NOP | A processor instruction that does not alter the state of the processor with the exception to advance the program counter. Some processors remove this instruction in the instruction pipeline to minimize pipeline latency. |
| NSA | See National Security Agency |
| Payment Card Industry | The industries participating in debit, credit, prepaid, e-purse, ATM, and POS cards, as well as associated businesses. |
| PCI | See Payment Card Industry |
| PID | See Process Identifier |
| Process Identifier | An integer used by the Linux, UNIX, and similar kernels to uniquely identify a process, e.g., a separately schedulable computer executable under the control of an operating system having an independent address space. |
| Processing Chain | Referring to a processor or external cache that is connected that is directly connected to instruction memory. |
| RPM Package Manager (RPM) | A package management system intended primarily for Linux distributions; the file format is the baseline package format of the Linux Standard Base. (The name is intentionally recursive) |
| RPM | See RPM Package Manager (RPM) |
| Secure Hash Algorithm 2 | A set of cryptographic hash functions designed by the United States National Security Agency (NSA). |
| Secure Hash Algorithm 3 | The latest member of the Secure Hash Algorithm family of standards, released by NIST on Aug. 5, 2015 |
| SHA-2 | See Secure Hash Algorithm 2 |
| SHA-3 | See Secure Hash Algorithm 3 |
| Supervisor Call | In computers, especially IBM mainframes, a supervisor call is a processor instruction that directs the processor to pass control of the computer to the operating system's supervisor program. Most SVCs are requests for a specific operating system service from an application program or another part of the operating system. |
| SVC | See Supervisor Call |
| Task Identifier | An integer used to identifier a task, e.g., a separately schedulable computer executable under the control of an operating system having an independent address space. |
| Thread Identifier | An integer used to identifier a thread, e.g., a separately schedulable computer executable under the control of an operating system, possibly sharing an address space with multiple threads, which can exist within one process, executing concurrently and sharing resources. |
| Threat agent | Threat agents are external entities that potentially may attack a computer system that satisfy one or more of the following criteria:<br>1. External entities not authorized to access assets may attempt to access them either by masquerading as an authorized entity or by attempting to use TSF services without proper authorization.<br>2. External entities authorized to access certain assets may attempt to access other assets they are not authorized to either by misusing services they are allowed to use or by masquerading as a different external entity.<br>3. Untrusted subjects may attempt to access assets they are not authorized to either by misusing services they are allowed to use or by masquerading as a different subject. Threat agents are typically characterized by a number of factors, such as expertise, available resources, and motivation, with motivation being linked directly to the value of the assets at stake. |
| TID | See Task Identifier or Thread Identifier |
| Uniform Resource Locator | A subset of URIs that, in addition to identifying a resource, provide a means of locating the resource by describing its primary access mechanism (e.g., its network "location"). |
| Universal Resource Identifier | A compact sequence of characters that identifies an abstract or physical resource; it can be further classified as a locator, a name, or both. |
| URI | See Universal Resource Identifier |
| URL | See Uniform Resource Locator |
| USENIX | The Advanced Computing Systems Association, originally called the Unix Users Group. |

What is claimed is:

1. A method of preventing code injection attacks, the method comprising:
  generating at least one random security tag having a length equal to or less than a length of native instructions configured for execution by a processor of a computer system;
  obtaining an instruction block comprising at least one instruction of the native instructions to be executed by the processor, the instruction block including at least one no-operation (NOP) instruction at at least one specified location within the instruction block;
  applying a first exclusive OR logical operation with the at least one random security tag to at least one instruction at the at least one specified location within the instruction block;
  storing the instruction block in instruction memory;
  fetching the instruction block from instruction memory including the at least one instruction at the at least one specified location for passing to a processing chain;
  applying a second exclusive OR logical operation with the at least one random security tag to the at least one instruction at the at least one specified location within the instruction block; and
  passing the instruction block to the processing chain.

2. The method of claim 1, wherein the obtaining the instruction block includes:
  calculating the at least one specified location within the instruction block for inserting the at least one NOP instruction; and
  inserting the at least one NOP instruction at the at least one specified location within the instruction block.

3. The method of claim 1, wherein the obtaining the instruction block includes:
  receiving the instruction block from an external source, wherein the at least one specified location is a known location; and
  storing the instruction block in non-volatile memory, the method further comprising processing the instruction block prior to the applying the first exclusive OR logical operation, wherein the processing the instruction block includes:
    verifying that an instruction at the at least one specified location is the NOP instruction; and
    when the instruction at the at least one specified location is not the NOP instruction, omitting the applying a first exclusive OR logical operation, the storing the instruction block in instruction memory, the fetching the instruction block, and passing the instruction block to the processing chain.

4. The method of claim 1, further comprising storing, subsequent to the applying the first exclusive OR logical operation, the instruction block in non-volatile memory, and wherein the storing the instruction block in the instruction memory includes loading the instruction block from the non-volatile memory to the instruction memory.

5. The method of claim 1, further comprising storing, prior to the applying the first exclusive OR logical operation, the instruction block in non-volatile memory, wherein the applying the first exclusive OR logical operation includes:
retrieving the instruction block from the non-volatile; and
applying the first exclusive OR logical operation with the at least one random security tag to the at least one instruction at the at least one specified location within the instruction block.

6. The method of claim 1, wherein the at least one random security tag includes a plurality of random security tags, and wherein each security tag in the plurality of random security tags is designated a privilege level, the privilege level indicating that execution is permitted by the processor operating in a same privilege level.

7. The method of claim 6, wherein a first security tag in the plurality of random security tags is designated a first privilege level, and a second security tag in the plurality of random security tags is designated a second privilege level, the second privilege level being higher than the second privilege level, and wherein the first security tag is included instruction blocks to be executed at the first privilege level, and the second security tag is included in instruction blocks to be executed at the second privilege level.

8. The method of claim 7, wherein at least one of the first and second privilege levels includes one of a: unprivileged, supervisor privilege, and hypervisor privilege.

9. The method of claim 6, wherein a first security tag in the plurality of random security tags is designated a boot phase, and a second security tag in the plurality of random security tags is designated a normal operational phase, and wherein the first security tag is included in instruction blocks to be executed during boot phase, and the second security tag is included in instruction blocks to be executed during normal operational phase.

10. The method of claim 1, wherein the at least one random security tag includes a random security tag for at least one of: each unique user and each unique group of the computer system, and wherein a security tag is included in instruction blocks to be executed by each unique user, and a security tag is included in instruction blocks to be executed by each unique group.

11. The method of claim 1, wherein the at least one random security tag includes a plurality of random security tags, and wherein each security tag in the plurality of random security tags is associated with a different address range.

12. The method of claim 1, further comprising:
initiating a countdown-counter to a predetermined value;
performing the applying the second exclusive OR logical operation and the passing the instruction block to the processing chain;
the comparing on each of the instructions in the instruction block, wherein, for each instruction, the countdown-counter is decremented when the comparing does not indicate a NOP instruction, and the countdown-counter is reset when the comparing indicates a NOP instruction, and wherein the instruction block is deemed invalid when the countdown-counter reaches a zero count; and
asserting a hardware exception signaling the processor to enter an exception processing mode when the countdown-counter is deemed invalid, wherein the processor determines a reason the hardware exception was asserted.

13. The method of claim 1, wherein the generating at least one random security tag includes calculating a seed value based on at least one parameter unique to the computer system.

14. The method of claim 1, wherein the generating at least one random security tag is performed one time during first system boot;
storing the security tag in secure non-volatile storage;
retrieving the security tag from the secure non-volatile storage prior to the applying the first exclusive OR logical operation.

15. The method of claim 14, wherein the generating at least one random security tag is performed during every boot cycle subsequent to the first system boot.

16. The method of claim 1, wherein the generating at least one random security tag is performed on demand, or periodically under control of a system administrator;
storing the security tag in secure non-volatile storage; and
retrieving the security tag from secure non-volatile storage prior to the applying the first exclusive OR logical operation.

17. The method of claim 1, wherein the passing the instruction block to the processing chain includes:
comparing the result of the applying the second exclusive OR logical operation to the at least one instruction to determine whether the at least one instruction at the at least one specified location is the NOP instruction; and
when the comparing indicates that the at least one instruction at the at least one specified location is not the NOP instruction, asserting a hardware exception signaling the processor to enter an exception processing mode, wherein the processor determines a reason the hardware exception was asserted.

18. A system configured to prevent code injection attacks, the system comprising:
a memory;
at least one processor coupled to the memory;
a security tag generator configured to generate at least one random security tag having a length equal to or less than a length of native instructions configured for execution by the at least one processor;
a security tag insertion processor configured to:
obtain an instruction block comprising at least one instruction of the native instructions to be executed by the at least one processor, the instruction block including at least one no-operation (NOP) instruction at at least one specified location within the instruction block;
apply a first exclusive OR logical operation with the at least one random security tag to at least one instruction at the at least one specified location within the instruction block;
store the instruction block in instruction memory; a security tag processing unit configured to:
fetch the instruction block from instruction memory including the at least one instruction at the at least one specified location for passing to at least one processing chain; and
apply a second exclusive OR logical operation with the at least one random security tag to the at least one instruction at the at least one specified location within the instruction block; and
pass the instruction block to the at least one processing chain.

19. The system of claim 18, wherein the passing the instruction block to the at least one processing chain includes:
- comparing the result of applying the second exclusive OR logical operation to the at least one instruction to determine whether the at least one instruction at the at least one specified location is the NOP instruction;
- when the comparing indicates that the at least one instruction at the at least one specified location is not the NOP instruction, asserting a hardware exception signaling the at least one processing chain to enter an exception processing mode, wherein the at least one processing chain determines a reason the hardware exception was asserted.

20. A non-transitory computer readable medium having program code recorded thereon for preventing code injection attacks, the program code configured to cause one or more computers to:
- generate at least one random security tag having a length equal to or less than a length of native instructions configured for execution by a processor of a computer system;
- obtain an instruction block comprising at least one instruction of the native instructions to be executed by the processor, the instruction block including at least one no-operation (NOP) instruction at at least one specified location within the instruction block;
- apply a first exclusive OR logical operation with the at least one random security tag to at least one instruction at the at least one specified location within the instruction block;
- store the instruction block in instruction memory;
- fetch the instruction block from instruction memory including the at least one instruction at the at least one specified location for passing to a processing chain; and
- applying a second exclusive OR logical operation with the at least one random security tag to the at least one instruction at the at least one specified location within the instruction block; and
- passing the instruction block to the processing chain.

21. The non-transitory computer readable medium of claim 20, wherein passing the instruction block to the processing chain includes:
- comparing the result of the applying the second exclusive OR logical operation to the at least one instruction to determine whether the at least one instruction at the at least one specified location is the NOP instruction;
- when the comparing indicates that the at least one instruction at the at least one specified location is not the NOP instruction, omitting the passing the instruction block to the processor and asserting a hardware exception signaling the processor to enter an exception processing mode, wherein the processor determines a reason the hardware exception was asserted.

* * * * *